United States Patent
Brandis

(10) Patent No.: US 11,403,279 B1
(45) Date of Patent: Aug. 2, 2022

(54) ELECTRONIC DEVICE AND METHOD FOR BUILDING A REMAKE OF A TRANSACTION-PROCESSING SYSTEM

(71) Applicant: Marc Brandis AG, Zug (CH)

(72) Inventor: Marc Michael Brandis, Zug (CH)

(73) Assignee: MARC BRANDIS AG, Zug (CH)

( * ) Notice: Subject to any disclaimer, the term of this patent is extended or adjusted under 35 U.S.C. 154(b) by 0 days.

(21) Appl. No.: 16/209,178

(22) Filed: Dec. 4, 2018

(51) Int. Cl.
- *G06F 16/00* (2019.01)
- *G06F 16/23* (2019.01)
- *G06F 16/2455* (2019.01)

(52) U.S. Cl.
CPC .... *G06F 16/2365* (2019.01); *G06F 16/24568* (2019.01)

(58) Field of Classification Search
None
See application file for complete search history.

(56) References Cited

U.S. PATENT DOCUMENTS

| | | | |
|---|---|---|---|
| 6,971,096 B1 * | 11/2005 | Ankireddipally | G06F 9/5038 707/999.1 |
| 9,450,849 B1 * | 9/2016 | Goldberg | H04L 43/026 |
| 9,946,624 B1 | 4/2018 | Kfir | |
| 10,061,573 B2 * | 8/2018 | Araya | G06F 8/447 |
| 2002/0059390 A1 * | 5/2002 | Fletcher | G06Q 10/10 709/201 |
| 2015/0234642 A1 * | 8/2015 | Araya | G06F 8/76 717/137 |
| 2018/0330289 A1 * | 11/2018 | Kothari | G06Q 10/063 |

FOREIGN PATENT DOCUMENTS

EP 18197679.6 9/2018

OTHER PUBLICATIONS

Van der Aalst et al., *Process Mining Manifesto*, pp. 169-194 (2012).
OMG® Unified Modeling Language® (OMG UML®), Version 2.5.1, pp. 1-754, Dec. 2017.

(Continued)

*Primary Examiner* — Farhan M Syed
(74) *Attorney, Agent, or Firm* — Ostrolenk Faber LLP

(57) ABSTRACT

The invention concerns an electronic device for at least partially building a remake system of a transaction-processing system and a method being implemented using such an electronic device. The transaction-processing system performs transaction each related to a particular set of transaction related messages received and transmitted by the transaction-processing system. The electronic device is configured to collect transaction related messages received and transmitted by the running transaction-processing system. The electronic device is configured to determine from the collected transaction related messages sets of transaction related messages, each set being the result of a particular transaction. The electronic device is configured to assign transaction templates to one or more sets of transaction related messages, each transaction template including a specification of the transaction. The electronic device is configured to use the transaction templates for at least partially building the remake system of the transaction-processing system.

18 Claims, 22 Drawing Sheets

(56) References Cited

OTHER PUBLICATIONS

Wikipedia contributors, "Systems management," *Wikipedia, The Free Encyclopedia*, https://en.wikipedia.org/w/index.php?title=Systems_management&oldid=860311017 (accessed Dec. 5, 2018).
Wikipedia contributors, "Static program analysis," *Wikipedia, The Free Encyclopedia*, https://en.wikipedia.org/w/index.php?title=Static_program_analysis&oldid=865582723 (accessed Dec. 5, 2018).
Wikipedia contributors, "Prior knowledge for pattern recognition," *Wikipedia, The Free Encyclopedia*, https://en.wikipedia.org/w/index.php?title=Prior_knowledge_for_pattern_recognition&oldid=799308468 (accessed Dec. 5, 2018.
J. Matoušek et al., Understanding and Using Linear Programming, pp. 31-37 (2007).
Wikipedia contributors, "List of systems management systems," *Wikipedia, The Free Encyclopedia*, https://en.wikipedia.org/w/index.php?title=List_of_systems_management_systems&oldid=860311018 (accessed Dec. 5, 2018).
I. Goodfellow et al., *Deep Learning*, (selected pages attached) (2016).
Wikipedia contributors, "Finite-state transducer," *Wikipedia, The Free Encyclopedia*, https://en.wikipedia.org/w/index.php?title=Finite-state_transducer&oldid=853170484 (accessed Dec. 5, 2018).
Wikipedia contributors, 'Finite-state machine', *Wikipedia, The Free Encyclopedia*, Nov. 18, 2018, 13:29 UTC, https://en.wikipedia.org/w/index.php?title=Finite-state_machine&oldid=869416027 (accessed Dec. 5, 2018).
Wikipedia contributors, "Classes of computers," *Wikipedia, The Free Encyclopedia*, https://en.wikipedia.org/w/index.php?title=Classes_of_computers&oldid=870717404 (accessed Dec. 5, 2018).
Wikipedia contributors, "Backpropagation," *Wikipedia, The Free Encyclopedia*, https://en.wikipedia.org/w/index.php?title=Backpropagation&oldid=871032328 (accessed Dec. 5, 2018).
Aho et al., "Compilers, Principles, Techniques, and Tools," *Pearson New International Edition*, pp. 152-155.
Wikipedia contributors, "Activation function," *Wikipedia, The Free Encyclopedia*, https://en.wikipedia.org/w/index.php?title=Activation_function&oldid=871310719 (accessed Dec. 5, 2018).

* cited by examiner

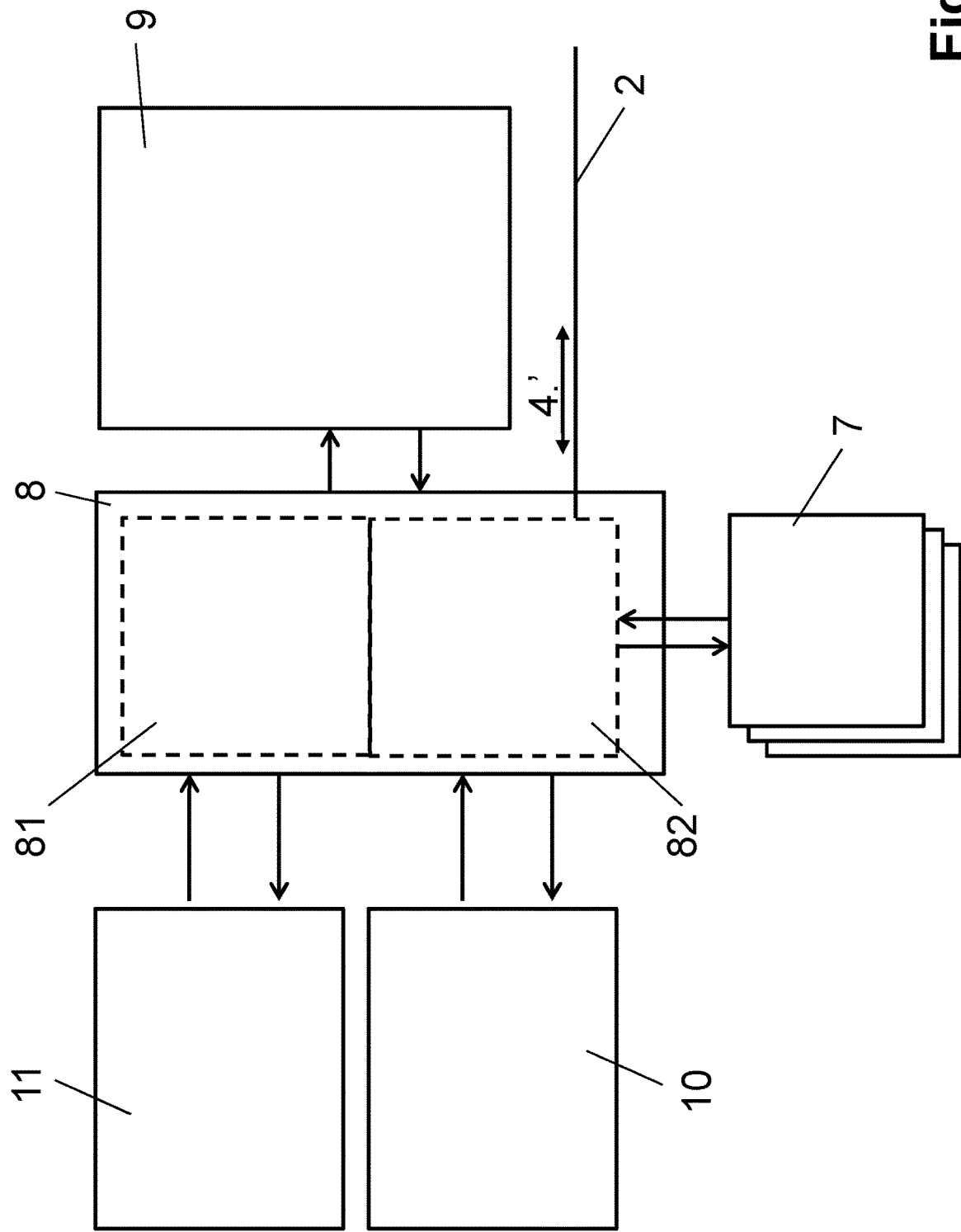

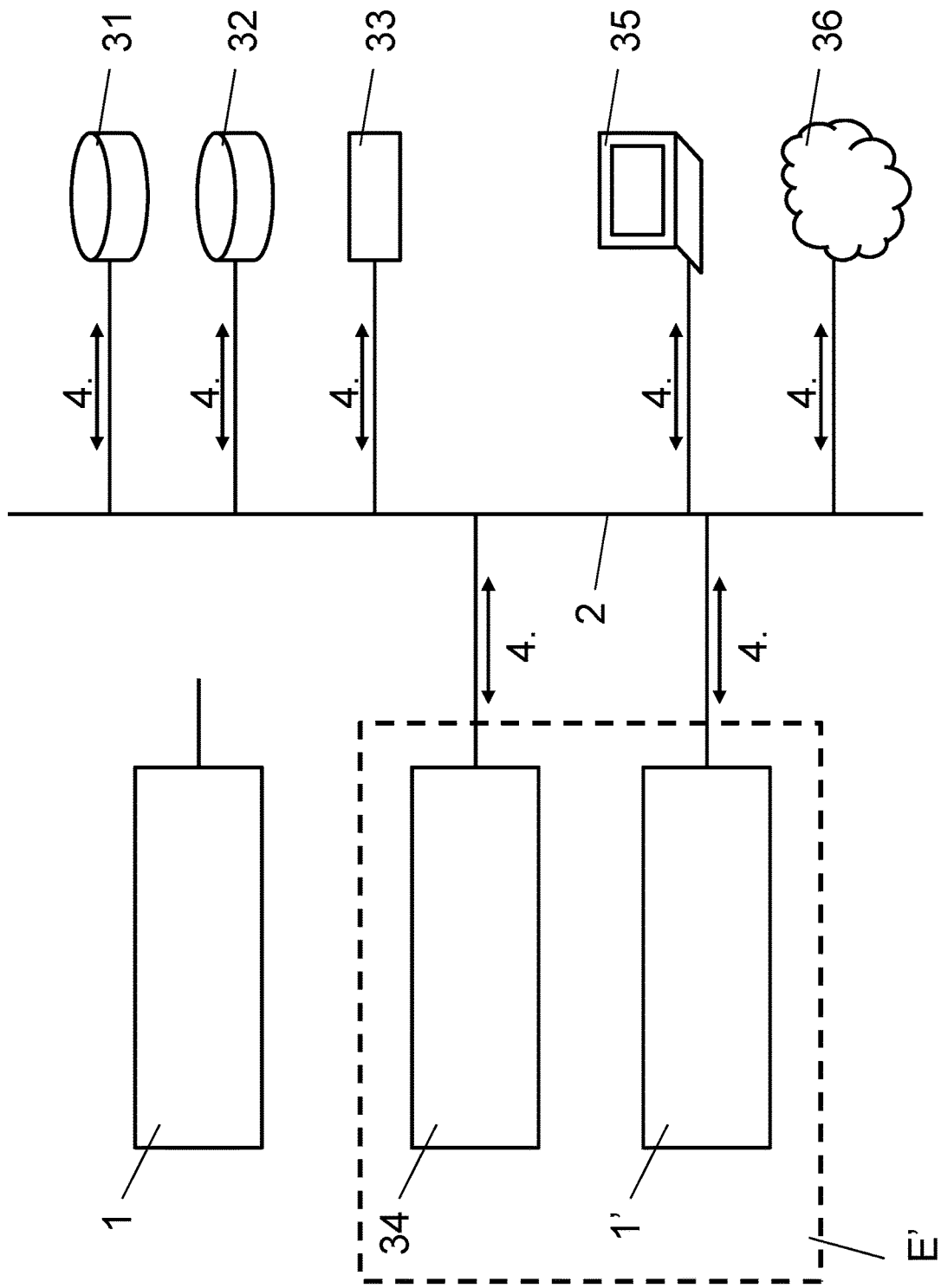

| Timestamp | Direction | Interface ID | | | | | | |
|---|---|---|---|---|---|---|---|---|
| 1 | IN | "Orders" | "WireTransfer" | | 100.00 | USD | 123-ABC | Bank-A | 456-ANF |
| 3 | OUT | "Accounts" | "GetAccountInfo" | "GAI-3-001" | 123-ABC | | | |
| 4 | IN | "Accounts" | "GAI-3-001" | | USD | | | |
| 7 | OUT | "Accounts" | "GetAccountInfo" | "GAI-7-001" | 456-ANF | | | |
| 9 | IN | "Accounts" | "GAI-7-001" | | USD | | | |
| 14 | OUT | "Booking" | "Book" | | 100.00 | 123-ABC | 100.00 | 456-ANF |

| Timestamp | Direction | Interface ID | | | | | | |
|---|---|---|---|---|---|---|---|---|
| 20 | IN | "Orders" | "WireTransfer" | | 200.00 | USD | 123-ABC | Bank-B | XYZ-987 |
| 21 | OUT | "Accounts" | "GetAccountInfo" | "GAI-21-001" | 123-ABC | | | |
| 23 | IN | "Accounts" | "GAI-21-001" | | USD | | | |
| 27 | OUT | "PayPath" | "GetPayPath" | "GPP-27-001" | Bank-B | USD | | |
| 30 | IN | "PayPath" | "GPP-27-001" | SWF-BB-NAB | 001-BBA | BAX-333 | | |
| 30 | OUT | "SWIFT" | SWF-BB-NAB | "Pay" | 200.00 | USD | BAX-333 | XYZ-987 |
| 32 | OUT | "Booking" | "Book" | | 200.00 | 123-ABC | 200.00 | 001-BBA |

Fig. 6a

| Timestamp | Direction | Interface ID | | | | | |
|---|---|---|---|---|---|---|---|
| 40 | IN | "Orders" | "WireTransfer" | | 300.00 | GBP | 123-ABC | Bank-B | XAB-900 |
| 41 | OUT | "Accounts" | "GAI-41-001" | "GetAccountInfo" | 123-ABC | | | |
| 45 | IN | "Accounts" | "GAI-41-001" | 123-ABC | USD | | | |
| 45 | OUT | "PayPath" | "GPP-45-001" | "GetPayPath" | | GBP | Bank-B | |
| 47 | IN | "PayPath" | "GPP-45-001" | SWF-BB-NAB | BAG-401 | 003-BBG | | |
| 47 | OUT | "FX" | "GFX-47-001" | "GetCurrentRate" | GBPUSD | | | |
| 48 | IN | "FX" | "GFX-47-001" | GBPUSD | 1.2903 | | | |
| 50 | OUT | "SWIFT" | SWF-BB-NAB | "Pay" | 300.00 | GBP | BAG-401 | XAB-900 |
| 50 | OUT | "Booking" | "Book" | | 387.09 | 123-ABC | 300.00 | 003-BBG |

| Timestamp | Direction | Interface ID | | | | | |
|---|---|---|---|---|---|---|---|
| 60 | IN | "Orders" | "WireTransfer" | | 4'000.00 | TRY | 123-ABC | Bank-C | C3C-911 |
| 62 | OUT | "Accounts" | "GAI-62-001" | "GetAccountInfo" | 123-ABC | | | |
| 63 | IN | "Accounts" | "GAI-62-001" | 123-ABC | USD | | | |
| 65 | OUT | "PayPath" | "GPP-65-001" | "GetPayPath" | | TRY | Bank-C | |
| 67 | IN | "PayPath" | "GPP-65-001" | TCC-3C-RRZ | C0C-722 | 003-BCT | | |
| 68 | OUT | "FX" | "GFX-68-001" | "GetCurrentRate" | TRYUSD | | | |
| 69 | IN | "FX" | "GFX-68-001" | TRYUSD | 0.1899 | | | |
| 71 | OUT | "SWIFT" | TCC-3C-RRZ | "Pay" | 4'000.00 | TRY | C0C-722 | C3C-911 |
| 72 | OUT | "Booking" | "Book" | | 759.61 | 123-ABC | 4'000.00 | 003-BCT |

| Timestamp | Direction | Interface ID | | | | | |
|---|---|---|---|---|---|---|---|
| 80 | IN | "Orders" | "WireTransfer" | | 500.00 | USD | 456-DEF | Bank-A | 123-ABC |
| 83 | OUT | "Accounts" | "GAI-83-001" | "GetAccountInfo" | 456-DEF | | | |
| 84 | IN | "Accounts" | "GAI-83-001" | 456-DEF | USD | | | |
| 87 | OUT | "Accounts" | "GAI-87-001" | "GetAccountInfo" | 123-ABC | | | |
| 89 | IN | "Accounts" | "GAI-87-001" | 123-ABC | USD | | | |
| 93 | OUT | "Booking" | "Book" | | 500.00 | 456-DEF | 500.00 | 123-ABC |

Fig. 6b

| Tx-local Msg No | 0 | 1 | 2 | 3 | 4 | 5 | 6 | 7 | 8 |
|---|---|---|---|---|---|---|---|---|---|
| 0 | 1 | IN | "Orders" | "WireTransfer" | | 100.00 | USD | 123-ABC | Bank-A | 456-ANF |
| 1 | 3 | OUT | "Accounts" | "GAI-3-001" | "GetAccountInfo" | 123-ABC | | | | |
| | | | | =TRANSFORM:APPEND('GAI-','[1,0]','-001') | =CONST("GetAccountInfo") | =COPY([0,6]) | | | |
| 2 | 4 | IN | "Accounts" | "GAI-3-001" | | 123-ABC | USD | | | |
| 3 | 7 | OUT | "Accounts" | "GAI-7-001" | "GetAccountInfo" | 456-ANF | | | | |
| | | | | =TRANSFORM:APPEND('GAI-','[3,0]','-001') | =CONST("GetAccountInfo") | =COPY([0,8]) | | | |
| 4 | 9 | IN | "Accounts" | "GAI-7-001" | | 456-ANF | USD | | | |
| 5 | 14 | OUT | "Booking" | "Book" | | | 100.00 | 123-ABC | 100.00 | 456-ANF |
| | | | | =CONST("Book") | =COPY([0,4]) | =COPY([0,6]);<br>=COPY([2,4]) | =COPY([0,4]) | =COPY([0,8]);<br>=COPY([4,4]) | |

Fig. 7a

| Tx-local Msg No | 0 | 1 | 2 | 3 | 4 | 5 | 6 | 7 | 8 |
|---|---|---|---|---|---|---|---|---|---|
| 0 | 20 | IN | "Orders" | "WireTransfer" | 200.00 | USD | 123-ABC | Bank-B | XYZ-987 |
| 1 | 21 | OUT | "Accounts" | "GAI-21-001" | "GetAccountInfo" | | | | |
|   |    |     |            | =TRANSFORM:APPEND('GAI-','[1,0]','-001') | =CONST("GetAccountInfo") | =COPY([0,6]) | | | |
| 2 | 23 | IN | "Accounts" | "GAI-21-001" | | 123-ABC | USD | | |
| 3 | 27 | OUT | "PayPath" | "GPP-27-001" | "GetPayPath" | | Bank-B | | |
|   |    |     |            | =TRANSFORM:APPEND('GPP-','[3,0]','-001') | =CONST("GetPayPath") | =COPY([0,7]) | =COPY([0,5]);=COPY([2,5]) | | |
| 4 | 30 | IN | "PayPath" | "GPP-27-001" | SWF-BB-NAB | 001-BBA | BAX-333 | | |
| 5 | 30 | OUT | "SWIFT" | SWF-BB-NAB | "Pay" | 200.00 | 200.00 | BAX-333 | XYZ-987 |
|   |    |     |         | =COPY([4,4]) | =CONST("Pay") | =COPY([0,4]) | =COPY([0,5]);=COPY([2,5]) | =COPY([4,6]) 001-BBA | =COPY([0,8]) |
| 6 | 32 | OUT | "Booking" | "Book" | | 200.00 | 123-ABC | | |
|   |    |     |           | =CONST("Book") | =COPY([0,4]) | =COPY([0,6]);=COPY([2,4]) | =COPY([0,4]) | =COPY([4,5]) | |

Fig. 7b

| Tx-local | Msg No | 0 | 1 | 2 | 3 | 4 | 5 | 6 | 7 | 8 |
|---|---|---|---|---|---|---|---|---|---|---|
| 0 | 40 | IN | "Orders" | "WireTransfer" |  | 300.00 | GBP | 123-ABC | Bank-B | XAB-900 |
| 1 | 41 | OUT | "Accounts" | "GAI-41-001" | "GetAccountInfo" | 123-ABC |  |  |  |  |
|  |  |  |  | =TRANSFORM:APPEND('GAI-','[1,0]','-001') | =CONST("GetAccountInfo") | =COPY([0,6]) |  |  |  |  |
| 2 | 45 | IN | "Accounts" | "GAI-41-001" |  | 123-ABC | USD |  |  |  |
| 3 | 45 | OUT | "PayPath" | "GPP-45-001" | "GetPayPath" |  | Bank-B |  |  |  |
|  |  |  |  | =TRANSFORM:APPEND('GPP-','[3,0]','-001') | =CONST("GetPayPath") | =COPY([0,5]) |  |  |  |  |
| 4 | 47 | IN | "PayPath" | "GPP-45-001" | SWF-BB-NAB |  |  | 003-BBG | =COPY([0,7]) |  |
| 5 | 47 | OUT | "FX" | "GFX-47-001" | "GetCurrentRate" | GBPUSD |  |  |  |  |
|  |  |  |  | =TRANSFORM:APPEND('GFX-','[5,0]','-001') | =CONST("GetCurrentRate") |  |  |  |  |  |
| 6 | 48 | IN | "FX" | "GFX-47-001" |  | GBPUSD | 1.2903 |  |  |  |
| 7 | 50 | OUT | "SWIFT" | SWF-BB-NAB | "Pay" |  | 300.00 | GBP | BAG-401 | XAB-900 |
|  |  |  |  | =COPY([4,4]) | =CONST("Pay") | =COPY([0,4]) | =COPY([0,5]) | =COPY([0,5]) | =COPY([4,6]) | =COPY([0,8]) |
|  |  |  |  |  |  | 387.09 | 123-ABC |  | 003-BBG |  |
| 8 | 50 | IN | "Booking" | "Book" |  |  |  |  |  |  |
|  |  |  |  | =CONST("Book") | =DOMAIN:FX_CONVERSION([0,4],[0,5],[2,5],[6,5]) | =COPY([0,6]); =COPY([2,4]) | =COPY([0,4]) | =COPY([0,5]) | =COPY([4,5]) |  |

Fig. 7c

| Tx-local Msg No | 0 | 1 | 2 | 3 | 4 | 5 | 6 | 7 | 8 |
|---|---|---|---|---|---|---|---|---|---|
| 0 | 60 | IN | "Orders" | "WireTransfer" | 4'000.00 | TRY | 123-ABC | Bank-C | C3C-911 |
| 1 | 62 | OUT | "Accounts" | "GAI-62-001"<br>=TRANSFORM:APPEND('GAI-','[1,0]','-001') | "GetAccountInfo" | 123-ABC | | | |
| 2 | 63 | IN | "Accounts" | "GAI-62-001" | =CONST("GetAccountInfo") | =COPY([0,6]) | | | |
| 3 | 65 | OUT | "PayPath" | "GPP-65-001"<br>=TRANSFORM:APPEND('GPP-','[3,0]','-001') | "GetPayPath" | 123-ABC | USD | Bank-C | |
| 4 | 67 | IN | "PayPath" | "GPP-65-001" | =CONST("GetPayPath") | =COPY([0,7]) | =COPY([0,5]) | | |
| 5 | 68 | OUT | "FX" | "GFX-68-001"<br>=TRANSFORM:APPEND('GFX-','[5,0]','-001') | "GetCurrentRate" | TCC-3C-RRZ | 003-BCT | C0C-722 | |
| 6 | 69 | IN | "FX" | "GFX-68-001" | =CONST("GetCurrentRate") | TRYUSD<br>=TRANSFORMATION:APPEND([0,5],[2,5]) | | | |
| 7 | 71 | OUT | "SWIFT" | TCC-3C-RRZ | "Pay" | 0.1899<br>4'000.00<br>=COPY([0,4]) | TRY<br>=COPY([0,5]) | C0C-722<br>=COPY([4,6]) | C3C-911 |
| 8 | 72 | OUT | "Booking" | "Book"<br>=CONST("Book") | =DOMAIN:FX_CONVERSION<br>([0,4],[0,5],[2,5],[6,5]) | 759.6<br>=COPY([0,6]);<br>=COPY([2,4]) | 4'000.00<br>=COPY([0,4]) | 003-BCT<br>=COPY([4,5]) | =COPY([0,8]) |

Fig. 7d

| Tx-local Msg No | 0 | 1 | 2 | 3 | 4 | 5 | 6 | 7 | 8 |
|---|---|---|---|---|---|---|---|---|---|
| 0 | 80 | IN | "Orders" | "WireTransfer" | | 500.00 | USD | 456-DEF | Bank-A | 123-ABC |
| 1 | 83 | OUT | "Accounts" | "GAI-83-001" | "GetAccountInfo" | | 456-DEF | | | |
| | | | | =TRANSFORM:A PPEND('GAI-',[1,0],'-001') | =CONST("GetAccountInfo") | =COPY([0,6]) | | | | |
| 2 | 84 | IN | "Accounts" | "GAI-83-001" | | 456-DEF | USD | | | |
| 3 | 87 | OUT | "Accounts" | "GAI-87-001" | "GetAccountInfo" | | 123-ABC | | | |
| | | | | =TRANSFORM:A PPEND('GAI-',[3,0],'-001') | =CONST("GetAccountInfo") | =COPY([0,8]) | | | | |
| 4 | 89 | IN | "Accounts" | "GAI-87-001" | | 123-ABC | USD | | | |
| 5 | 93 | OUT | "Booking" | "Book" | | 500.00 | 456-DEF | 500.00 | 123-ABC | |
| | | | | =CONST("Book") | =COPY([0,4]) | =COPY([0,6]); =COPY([2,4]) | =COPY([0,4]) | =COPY([0,8]); =COPY([4,4]) | | |

Fig. 7e

| Tx-local Msg No | 0 | 1 | 2 | 3 | 4 | 5 | 6 | 7 | 8 |
|---|---|---|---|---|---|---|---|---|---|
| 0-- | IN | "Orders" | STRING | NUMBER | STRING | STRING | STRING | STRING | STRING |
| 1-- | OUT | "Accounts" | =TRANSFORM:APPEND('GAI-',[1,0],'-001') | =CONST("GetAccountInfo") | =COPY([0,6]) | | | | |
| 2-- | IN | "Accounts" | STRING | STRING | STRING | | | | |
| 3-- | OUT | "Accounts" | =TRANSFORM:APPEND('GAI-',[3,0],'-001') | =CONST("GetAccountInfo") | =COPY([0,8]) | | | | |
| 4-- | IN | "Accounts" | STRING | STRING | STRING | | | | |
| 5-- | OUT | "Booking" | =CONST("Book") | =COPY([0,4]) | =COPY([0,6]); =COPY([2,4]) | =COPY([0,4]) | =COPY([0,8]); =COPY([4,4]) | | |

| Tx-local Msg No | 0 | 1 | 2 | 3 | 4 | 5 | 6 | 7 | 8 |
|---|---|---|---|---|---|---|---|---|---|
| 0-- | IN | "Orders" | STRING | NUMBER | STRING | STRING | STRING | STRING | STRING |
| 1-- | OUT | "Accounts" | =TRANSFORM:APPEND('GAI-',[1,0],'-001') | =CONST("GetAccountInfo") | =COPY([0,6]) | | | | |
| 2-- | IN | "Accounts" | STRING | STRING | STRING | | | | |
| 3-- | OUT | "PayPath" | =TRANSFORM:APPEND('GPP-',[3,0],'-001') | =CONST("GetPayPath") | | =COPY([0,7]) | =COPY([0,5]); =COPY([2,5]) | | |
| 4-- | IN | "PayPath" | STRING | STRING | STRING | STRING | STRING | | |
| 5-- | OUT | "SWIFT" | =COPY([4,4]) | =CONST("Pay") | =COPY([0,4]) | =COPY([0,6]); =COPY([2,5]) | =COPY([0,5]); =COPY([2,5]) | =COPY([4,6]) | |
| 6-- | OUT | "Booking" | =CONST("Book") | =COPY([0,4]) | =COPY([0,6]); =COPY([2,4]) | =COPY([0,4]) | =COPY([0,4]) | =COPY([4,5]) | =COPY([0,8]) |

| Tx-local Msg No | 0 | 1 | 2 | 3 | 4 | 5 | 6 | 7 | 8 |
|---|---|---|---|---|---|---|---|---|---|
| 0 | -- | IN | "Orders" | STRING | NUMBER | STRING | STRING | STRING | STRING |
| 1 | -- | OUT | "Accounts" | =TRANSFORM:APPEND('GAI-',[1,0],'-001') | =CONST("GetAccountInfo") | =COPY([0,6]) | | | |
| 2 | -- | IN | "Accounts" | STRING | STRING | STRING | | | |
| 3 | -- | OUT | "PayPath" | =TRANSFORM:APPEND('GPP-',[3,0],'-001') | =CONST("GetPayPath") | =COPY([0,7]) | =COPY([0,5]) | | |
| 4 | -- | IN | "PayPath" | STRING | STRING | STRING | STRING | | |
| 5 | -- | OUT | "FX" | =TRANSFORM:APPEND('GFX-',[5,0],'-001') | =CONST("GetCurrentRate") | =TRANSFORM:APPEND([0,5],[2,5]) | | | |
| 6 | -- | IN | "FX" | STRING | STRING | NUMBER | | | |
| 7 | -- | OUT | "SWIFT" | =COPY([4,4]) | =CONST("Pay") | =COPY([0,4]) | =COPY([0,5]) | =COPY([4,6]) | =COPY([0,8]) |
| 8 | -- | OUT | "Booking" | =CONST("Book") | =DOMAIN:FX_CONVERSION([0,4],[0,5],[2,5],[6,5]) | =COPY([0,6]); =COPY([2,4]) | =COPY([0,4]) | =COPY([4,5]) | |

State Machine - NFA

State Machine - DFA

ELECTRONIC DEVICE AND METHOD FOR BUILDING A REMAKE OF A TRANSACTION-PROCESSING SYSTEM

FIELD OF THE INVENTION

The present disclosure relates to an electronic device and a method for building a remake system of a transaction-processing system.

BACKGROUND OF THE INVENTION

Transaction-processing systems are widely deployed in various industries, for example in financial services industries, logistics industries, travel industries, etc. Many transaction-processing systems exist, which were built several years ago, and which have nowadays become difficult to understand. Reasons for this difficulty include that over the years the systems have been enhanced multiple times by adding additional system parts and/or by changing existing system parts, sometimes violating the base architecture of the system to avoid large-scale changes to the original code while introducing new capabilities, thereby introducing difficult to understand and inconsistently designed software source code, sometimes introducing redundancy and/or inconsistency in data and functionality. Reasons also include non-existing or inconsistent system documentation not properly reflecting the actual system implementation, use of base technologies and/or programming languages which have become obsolete, or no staff understanding the system and/or the base technologies being available any more. Maintaining and replacing existing transaction-processing systems, including migrating them to different base technologies, has therefore become a difficult task.

There are other technologies aimed to assist in analyzing and/or remaking existing software systems, e.g. U.S. Pat. No. 10,061,573 B2 or patent application US 2018/0330289 A1. The present disclosure differs from those known technologies in its focus on transaction-processing systems, a different method of analyzing the original system, and in the outputs it generates, as will be set out in detail below.

Many transaction-processing systems have attributes as follows. Transaction-processing systems asynchronously receive transaction order messages. For example in financial services industries, transaction order messages may relate to the wire transfer of amounts of money between bank accounts, possibly involving the conversion between different currencies. Each transaction order message initiates the processing of a transaction. During transaction processing, the transaction-processing system may need access to additional data which may be stored on external systems. For example, access to an external system may be required in order to access customer, account, and balance information applicable to the transaction. Access to additional data may involve transmission and receipt of request/reply messages between the transaction-processing system and external systems. A transaction may end up with zero or more transaction result messages transmitted to external systems.

Examples of transaction-processing systems include payment processing systems, security processing systems, or credit processing systems in banks or other financial services companies, or underwriting or claims handling systems in insurance companies, or order management and invoicing systems in wholesale or retail distribution companies, or order management systems in logistics companies, or production line management systems in manufacturing companies. Many more transaction-processing systems are deployed in the mentioned industries as well as in other industries.

Conceptually, transaction-processing systems include functionality to orchestrate a business process for a transaction (i.e. applying a sequence of processing steps to a transaction, the set and order of steps decided based on attributes of the transaction order message or on transaction-related data)—often called "workflow", functionality to populate output data fields with data obtained in earlier processing steps for the transaction (e.g. copying a customer number received with the transaction order message into a request message for further data about the customer on another system), functionality to transform data (e.g. transforming between different data formats such as between textual and human-readable mm/dd/yyyy date format and numeric date format representing number of days since Dec. 31, 1899 used in Microsoft Excel formats, or setting of data attributes based on a set of other data attributes such as setting a "foreign payment" attribute to TRUE if the destination country code of a payment transaction does not match the country code of the bank entity processing the payment transaction), and application-domain specific functionalities (e.g. calculating a payable interest amount based on interest rate, principal amount, and duration).

The present invention addresses all transaction-processing systems, as well as any other systems with similar characteristics to those described above. Thus, so-called workflow systems or in general any systems that orchestrate a business process as a sequence of machine executed processing steps are transaction-processing systems in the meaning of the present definition. Also, so-called Message Hubs or in general any systems that provide transformation of data when transferring the data between systems are transaction-processing systems in the meaning of the present definition.

The present invention addresses the problem of analyzing, understanding, and remaking part, most or all of an existing transaction-processing system, possibly on different base technologies and infrastructures. It analyzes a large set of system input data and output data traces collected from the running transaction-processing system, deriving sequences of input and output messages related to the processing of a single transaction each. From the multitude of such sequences representing the processing of single transactions, it derives the overall workflow of the system (i.e. the sequencing of steps under different circumstances) expressed as a state machine (see https://en.wikipedia.org/wiki/Finite-state_machine) or more specifically a finite state transducer (see https://en.wikipedia.org/wiki/Finite-state_transducer) transducing a sequence of input messages into a set of processing actions. It also derives the flow of data from input messages to output messages, the application of transformation functions and of domain-specific functions on data, and the conditions under which different paths in the state machine are selected, and translates them into a set of processing actions needed to generate the output messages from the input messages. The present invention makes the analysis results available in machine-readable formats, which when loaded into a generic transaction-processing system configures the generic transaction-processing system to at least partially remake the original transaction-processing system in the sense that for the same input messages, it generates the same output messages. The analysis results available in machine-readable format may also be compiled into other possible implementations of state machines, data flow, and data transformation functionalities such as application-specific integrated circuits ASIC, programming of field-programmable gate arrays FPGA, or software code executable on a general purpose microprocessor, with that implementation serving as a remake system of the original transaction-processing system. Thus, the remake system of the transaction-processing system may have the form of a generic transaction-processing system having loaded analysis results in machine-readable formats, or the form of other possible implementations of state machines. Alternatively, the analysis results may also be output in a format suitable for human review (e.g. using Unified Modeling Language UML, see http://www.omg.org/spec/UML/2.5.1, retrieved Nov. 21, 2018, most notably workflow as UML State Machine Diagram).

Among other applications, automated testing of (transaction-processing or other) systems connected to transaction-processing systems may be required. Tools supporting the automated testing of systems may enable testing without real-life connected systems being in place in the test environment. For this purpose, input data and output data traces from a running system connected to real-life systems are collected, and the data traces are played back to the system during testing, thereby simulating the behavior of the real-life systems unavailable in the test environment. However, differences in the order in which operations are being processed or in the actual data used make such testing error-prone and sometimes ineffective. The present invention enables to create remake transaction-processing systems connected to the system under test, replicating parts or all of the functionality of connected transaction-processing systems, and avoiding disadvantages of testing by playing back recorded input data and output data traces.

U.S. Pat. No. 9,450,849B1 relates to trace backtracking. In response to receiving a request from an upstream component at a downstream component, a trace is initiated at the down-stream component. A response to the request is sent to the upstream component. The response comprises trace metadata. Trace data is generated at the upstream component. The trace data describes an interaction between the upstream component and the downstream component. A call graph is generated based on the trace data.

DELINEATION FROM OTHER TECHNOLOGIES

Computer-assisted reengineering of software systems has so far built on "static code analysis" (see https://en.wikipedia.org/wiki/Static_code_analysis), i.e. on analyzing the software source code making up the software system, thereby identifying relationships between different pieces of the software source code, redundancies, inconsistencies, and in some cases applying user-provided "rewriting patterns" to the software source code (e.g. for translating accesses to one type of database with accesses to another type of database, or for remaking user interface components from one base technology in another, such as in U.S. Pat. No. 10,061,573 B2). In some cases, such technologies also provide for automatic translation from one programming language into another programming language.

This disclosure differs from static code analysis in that it does not analyze the software source code, but rather input data and output data traces collected from the running software system. This disclosure is thereby agnostic to the underlying technologies (e.g. programming language, database system, operating system, hardware) used by the software system, and it ignores complexity having built-up within the software system as it was updated over the years, which is not visible to the outside in form of output or input data, or software system structures no more fitting the functionality of the system, or functionalities no more in use today.

In the context of the present disclosure, input data and output data "traces" denote the collection of data received and transmitted by the transaction-processing system. This data received and transmitted takes the form of messages, with each message having a particular set of "fields", and each "field" having a particular "value".

This disclosure differs from static code analysis in that it is only applicable to transaction-processing systems as defined above, while static code analysis.is applicable to any kind of software system. This disclosure only achieves coverage of all functionalities used during the observation period in which input data and output data traces were collected, while static code analysis achieves coverage of all functionalities the analyzed software system has. This later drawback of this disclosure may in some cases prove to be an advantage, in that it allows analyzing or remaking only part of the functionality of a transaction-processing system by filtering relevant input and output messages, e.g. only functionality used during nightly batch processing of data, only functionality linked to certain interfaces, or only functionality associated with certain process steps.

"Process mining" (see "Process Mining Manifesto", IEEE Task Force on Process Mining, https://link.springer.com/chapter/10.1007/978-3-642-28108-2_19, retrieved Nov. 21, 2018) analyzes logs of system events in order to discover business processes. There are similarities to this disclosure in that process mining analyzes data collected from a running system and that it derives workflows from the analysis. Process mining, however, does neither analyze complete input data and output data traces collected from a running system but rather just logs of system events, nor does it analyze flows of data and application of transformation and domain-specific functions, nor does it aim to remake an existing system.

The methods used in this disclosure have been inspired by machine-learning technologies commonly known, in particular iterative back-propagation (see https://en.wikipedia.org/wiki/Backpropagation), and (stochastic) gradient descent algorithms used in supervised deep learning methods for large scale neural networks (see Ian Goodfellow, Yoshua Bengio, and Aaron Courville, "Deep Learning", Sections 4.3 and 5.9, The MIT Press 2016, ISBN 9780262035613), and non-linear activation functions (see https://en.wikipedia.org/wiki/Activation_function) used in perceptrons. While the methods used with this disclosure are novel, they have similarities to deep-learning as follows:

Supervised deep-learning determines a large number of parameters (weights) configuring a (generic, often convolutional) large neural network, establishing a function on all input parameters having a very small deviation ("error") in its outputs vs. the sample set of (input, output) pairs used to train the network. This disclosure determines a large number of parameters (state transitions with predicates controlling which path is taken, actions) configuring a (generic) state machine representing the workflow and a large number of parameters configuring a (generic) data flow and transformation engine (instructions on how to compute an output field based on previous input fields), establishing identical outputs for a given input in as many cases seen in the collected input and output traces as possible.

Supervised deep-learning using the stochastic gradient descent algorithm determines a stable set of parameters—starting from an initial set of parameter values usually taken as random values—by using the (generic) neural network to calculate for given inputs its outputs, calculating an error function of calculated outputs vs. given output values (e.g. the sum of absolute differences between calculated output and expected output, called L1-norm), computing the gradient of the error function vs. any parameter at the current parameter value, and using the gradient to update the parameter value such that the error becomes smaller (i.e. following the gradient descending to a minimal error). This sequence of computations minimizing the error value is iterated until a set of parameters emerges having a stable error value (i.e. changing the parameters further does not reduce the error function, and thus a (local) minimum has been reached).

This disclosure determines a stable set of parameters to configure a (generic) state machine and a (generic) data flow and transformation engine, which form the generic transaction-processing system or the remake system described above, by 1) determining for every transaction for which an input and output trace was collected potential actions by which the outputs might have been computed from the inputs, 2) finding multiple such transaction input and output traces which have the same sequence of input and output message templates and in which output fields can be computed using the same actions, and associating them with a single transaction template, 3) using the identified transaction templates to determine parameters for a state machine and a data flow and transformation engine, which when executing and receiving the same input values, provide the same output values as in the collected input and output traces.

Furthermore, this disclosure provides for a library mechanism enabling the electronic device to access further transformation functions or application-domain specific functions to consider when searching for potential functions to compute output values from input values, thereby allowing to provide "prior knowledge" (see https://en.m.wikipedia.org/wiki/Prior_knowledge_for_pattern_recognition, retrieved Nov. 25, 2018) to its machine-learning mechanism without any change to the mechanism itself, and thereby adapting itself to the application-domain of the transaction-processing system. Functions in libraries may be obtained using other machine-learning mechanisms (e.g. regression functions implemented by a convolutional neural network trained using supervised deep-learning), statistical analysis of inputs and outputs (e.g. finding perfect correlations between input and output values, where an input value always map to the same output value), or by accessing software code libraries including relevant data transformation functions or application-domain specific functions.

Furthermore, this disclosure provides for iteratively improving the parametrization of the state machine and the data flow and transformation engine (i.e. reducing its "error" vs. the outputs of the original transaction-processing system) by 1) operating the original transaction-processing system and the remake system in parallel, feeding transaction order messages into both systems in parallel, 2) collecting the inputs and outputs of both systems and determining differences in between them, and 3) using those differences to rerun part or all of previously described analyses in order to change the parameters of state machine and data flow and transformation engine, such that those differences disappear.

SUMMARY OF THE INVENTION

The invention relates to an electronic device for at least partially building a remake system of a transaction-processing system, wherein the transaction-processing system performs transactions each related to a particular set of transaction related messages received and transmitted by the transaction-processing system. The electronic device is configured to: collect transaction related messages received and transmitted by the running transaction-processing system; determine from the collected transaction related messages sets of transaction related messages, each set being related to a particular transaction; assign transaction templates to one or more sets of transaction related messages, each transaction template including a specification of the transaction; and use the transaction templates for at least partially building the remake system of the transaction-processing system.

In an embodiment, the electronic device is further configured to collect one or more of transaction order messages, request/reply messages, and transaction result messages, and to assign transaction templates on the basis of the one or more of the transaction order messages, the request/reply messages, and the transaction result messages.

In an embodiment, the electronic device is further configured to extract common transaction templates for two or more transactions.

In an embodiment, the electronic device is further configured to use the transaction templates for the definition of a state machine.

In an embodiment, the electronic device is configured to at least partially build the remake system in the form of a software application executable on a standard computer.

In an embodiment, the electronic device is further configured to determine differences between transaction related output messages of the running transaction-processing system and transaction related messages of the remake system operating in parallel and receiving the same transaction related input messages as the running transaction-processing system and to at least partially update the remake system accordingly.

In an embodiment, the electronic device is further configured to at least partially build the remake system in a form enabling moving an auxiliary system interacting with the running transaction-processing system into a test environment for the purpose of testing the auxiliary system without the transaction-processing system being available in the test environment.

In an embodiment, the electronic device is further configured to collect transaction related messages received and transmitted by the transaction-processing system running in a test environment enabling processing of transactions in a strictly sequential manner.

In an embodiment, the electronic device is further configured to collect transaction related messages received and transmitted by the running transaction-processing system being adapted to provide transaction related messages which include an unambiguous identifier for each transaction.

In an embodiment, the electronic device is further configured to collect transaction related messages received and transmitted by the running transaction-processing system being installed in a productive environment.

The invention also relates to a method for building a remake system of a transaction-processing system, the method being implemented using an electronic device as described above. The invention also relates to a non-transitory computer-readable storage medium storing computer-executable instructions for building a remake system of a transaction-processing system.

In accordance with some embodiments, an electronic device includes one or more computer network interfaces, one or more processors, memory, and one or more programs.

The one or more computer network interfaces are connectable to the transaction-processing system for collecting transaction related messages received and transmitted by the running transaction-processing system. The one or more computer network interfaces may be wired (such as Ethernet) and/or wireless (such as a mobile network, a WiFi network, etc.). The one or more programs are stored in the memory and configured to be executed by the one or more processors. The memory may be volatile (such as random access memory (RAM)) and/or non-volatile (such as read-only memory (ROM), flash memory, etc). The one or more processors may be a central processing unit (CPU), a microprocessor, a multi-core processor, etc. The one or more programs include computer-executable instructions for performing the operations of the functions of the electronic device and/or the method steps as described in the present disclosure. The computer-executable instructions may be written in any suitable programming language. In accordance with some embodiments, a non-transitory computer readable storage medium has stored therein instructions, which, when executed by an electronic device having one or more computer network interfaces, memory and one or more processors, cause the electronic device to perform the operations of the functions and/or the method steps described above. The non-transitory computer readable storage medium can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments. However, non-transitory computer-readable storage media does not include transitory media such as carrier waves or the like.

BRIEF DESCRIPTION OF THE DRAWINGS

In the following, advantageous embodiments of the invention will be described with reference to the enclosed drawings. However, neither the drawings nor the description shall be interpreted as limiting the invention.

FIG. 2b illustrates a generic transaction-processing system remaking respective functions of a transaction-processing system by generating the same sets of messages;

FIG. 5 illustrates schematically illustrates schematically a remake system of the transaction-processing system, installed in a test environment for testing another system;

FIGS. 6a, 6b illustrate schematically examples of single transaction traces;

FIGS. 7a, 7b, 7c, 7d, 7e illustrate schematically examples of single transaction traces with associated potential actions;

FIGS. 8a, 8b illustrates schematically transaction templates generalized from single transaction traces;

DETAILED DESCRIPTION OF PREFERRED EMBODIMENTS OF THE INVENTION

In the following, the abbreviation iff is used for stating "if and only if".

Figure 1:
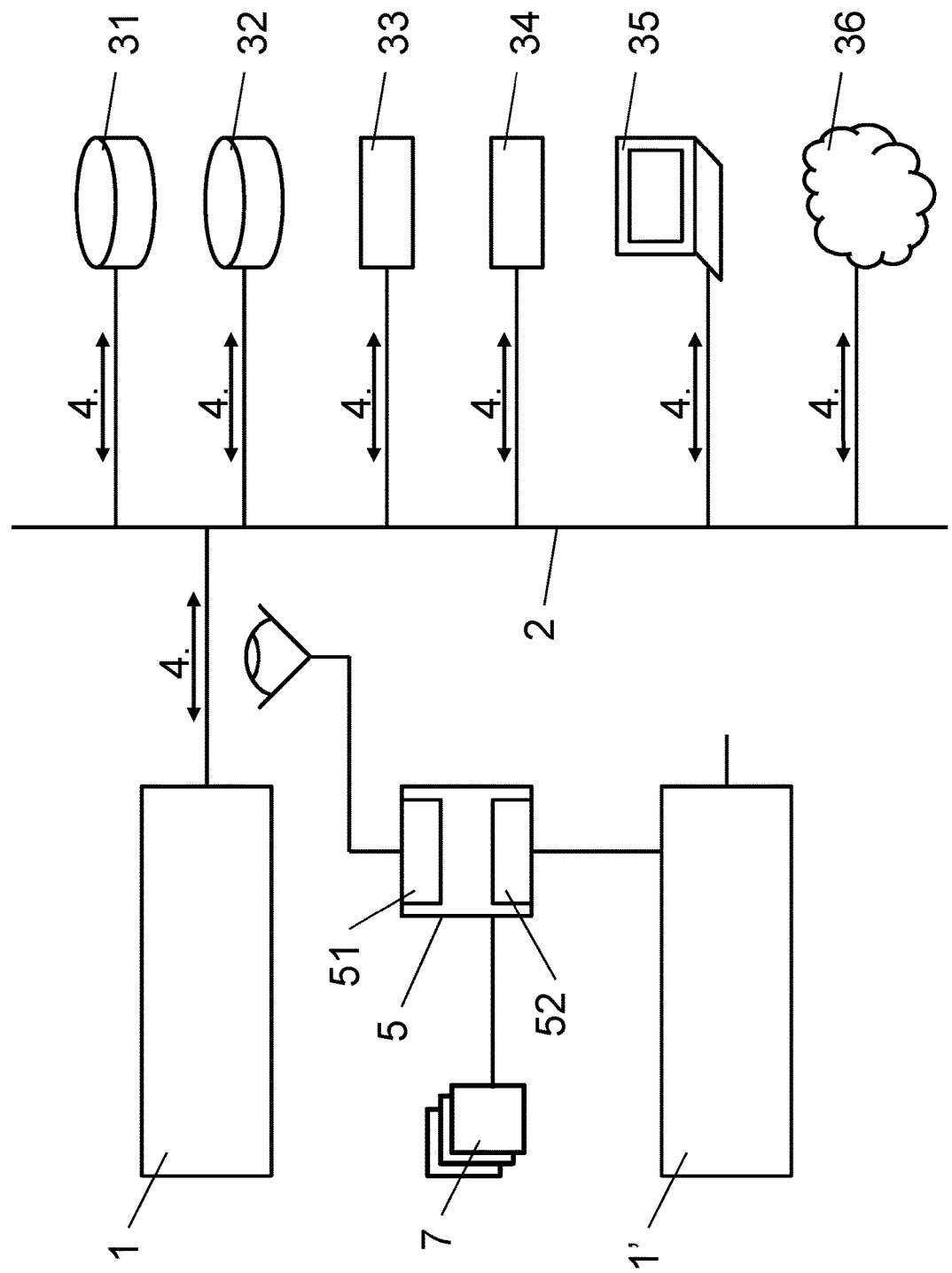
FIG. 1 illustrates schematically a transaction-processing system connected via a network to a plurality of other systems.

FIG. 1 illustrates schematically a transaction-processing system 1 connected via network 2 to a plurality of other systems 31-36, wherein various transaction related messages 4. are transmitted between the transaction-processing system 1 and the other systems 31-36.

The transaction-processing system 1 may provide processing of transactions in the financial services industry, logistics industry, travel industry, etc. Other embodiments of the transaction-processing system 1 are possible.

The other systems 31-36 may include database systems 31, 32, more specifically hierarchical, relational, object-oriented, key-value, or other types of database systems providing for storing and retrieving data persistently. The other systems 31-36 may include mainframe computers or supercomputers 33, 34. The other systems 31-36 may include a computer terminal 35 operable by a human operator. The other systems 31-36 may include cloud computing services 36. Other embodiments of the other systems 31-36 are possible.

For technical reasons, apart from the transaction related messages 4. transmitted between the transaction-processing system 1 and the other systems 31-36, further data not related to the processing of transactions (not illustrated in FIG. 1) is received and transmitted by the transaction-processing system 1, such as data related to the operation of the network 2, data related to the operation of the transaction-processing system 1, etc. Further data may include TCP/IP messages such as ARP messages (Address Resolution Protocol), systems management related messages (see https://en.wikipedia.org/wiki/Systems_management) communicated between systems management tools (see https://en.wikipedia.org/wiki/List_of_systems_nnanagement_systems), etc.

The transaction-processing system 1 is designed to receive asynchronously transaction order messages $4o$ and to process the corresponding transaction accordingly. For a particular first transaction C1, the transaction-processing system 1 receives a first transaction order message $4o1$ from one of the other systems 31-36. Transaction order message 4o1 instructs transaction-processing system 1 to initiate the processing of a new transaction C1, with relevant parameters included in transaction order message 4o1. Processing of first transaction C1 may involve access to data stored on one or more of the other systems 31-36. Access to data stored on one or more of the other systems 31-36 may involve one or more request/reply messages 4q1,4y1 transmitted between the transaction-processing system 1 and the other systems 31-36. Processing of first transaction C1 ends up with zero or more first transaction result messages 4r1.

Figure 2:
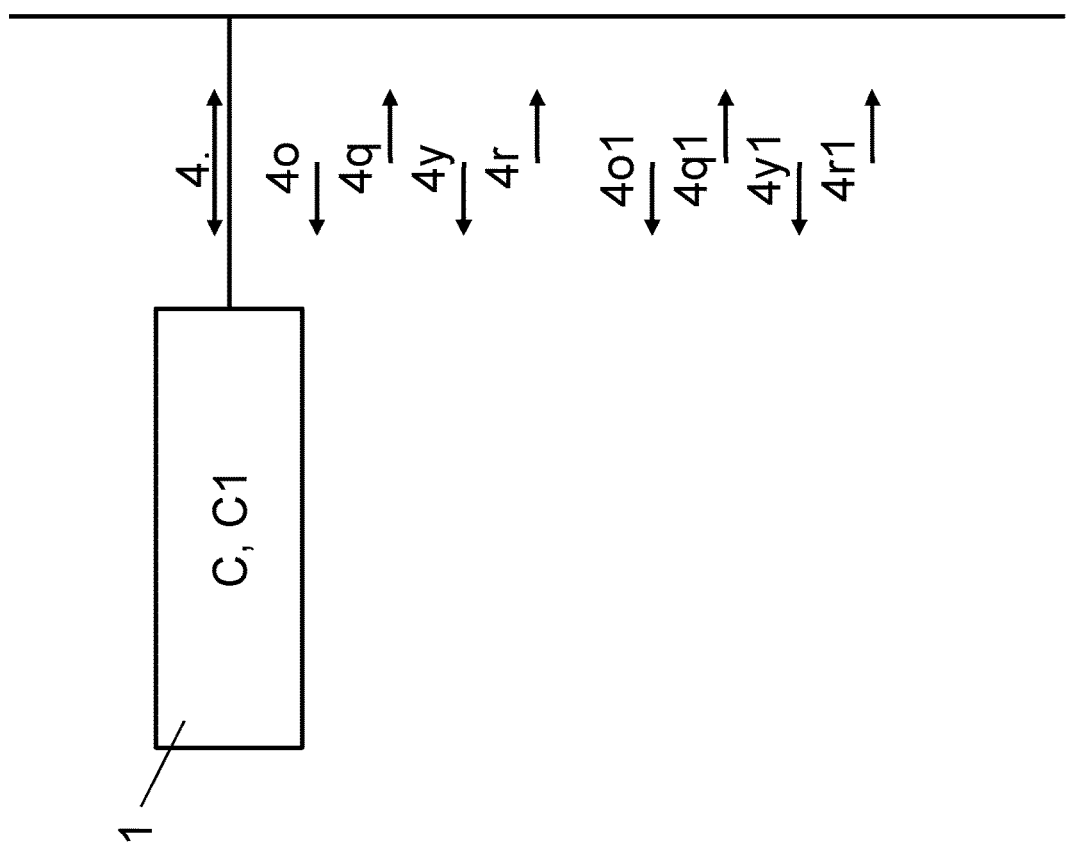
FIG. 2 illustrates schematically a transaction-processing system which processes transactions.

FIG. 2 illustrates schematically a transaction-processing system 1 which processes transactions C, in particular a first transaction C1 and further transactions C2, C3, . . . , Cn (not illustrated in FIG. 2). A transaction-processing system 1 may process more than 100'000 transactions C daily. The transaction-processing system 1 receives and transmits asynchronously transaction related messages 4. The transaction-processing system 1 receives asynchronously transaction order messages 4o, in particular a first transaction order messages 4o1 of the first transaction C1, transmits request messages 4q, in particular first request messages 4q1 of the first transaction C1, receives reply messages 4y, in particular first reply messages 4y1 of the first transaction C1, and transmits zero or more transaction result messages 4r, in particular zero or more first transaction result messages 4r1 of the first transaction C1. In a variant, the first transaction order message 4o1 may not involve any one or more first request/reply messages 4q1, 4y1, and/or it may not involve any one or more first transaction result messages 4r1.

The transaction related messages 4. are transmitted and received by the transaction-processing system 1 asynchronously. Upon receipt of a transaction order message 4o initiating a particular transaction C, further transaction related messages 4. related to the particular transaction C are transmitted and received by the transaction-processing system 1 asynchronously. The delay between messages 4. depends on various factors, such as the system load of the transaction-processing system 1, the system load of the other systems 31-36, the network load of the network 2, etc. The different messages 4. related to the processing of different transactions C are thus interleaved on network 2.

FIG. 1 illustrates schematically an electronic device 5 for building a remake system 1' of the transaction-processing system 1. The electronic device 5 includes a data collector 51 for collecting data flowing into the transaction-processing system 1 and flowing out from the transaction-processing system 1. Collection of data is performed by copying and storing the data flowing into and out from the transaction-processing system 1. The collected data includes the transaction related messages 4., namely the transaction order messages 4o, the request/reply messages 4q, 4y, and the transaction result messages 4r. The electronic device 5 includes a remake builder 52 for building the remake system 1' of the transaction-processing system 1. The electronic device 5 is connected to libraries 7 of transformation functions and application-domain specific functions which provide "prior knowledge" as described above and below.

Libraries 7 provide for a set of functions which may be required by remake system 1' to transform data between different formats (such as for example transforming a date in mm/dd/yyyy textual format to the numeric format number of days since Dec. 31, 1899 used by Microsoft Excel), or to calculate application-domain specific functions (such as for example calculating payable interest amount based on interest rate, principal amount, and duration in banking). The electronic device 5 accesses these functions available from libraries 7 in its analysis of the transaction related messages 4. and in building remake system 1'. Libraries 7 are also connected to remake 1' and are accessed by remake 1' during its operation.

The transaction-processing system 1 may relate to a minicomputer, to a mainframe computer, to a supercomputer, etc. (see https://en.wikipedia.org/wiki/Classes_of_computers) designed to process transactions C.

The transaction-processing system 1 may relate to an application software, to a computer program, to a computer process, a programmed field-programmable gate array FPGA, an application-specific integrated circuit ASIC, discrete electronic circuitry, etc. or any combination thereof designed to process transactions C.

Independent from the transaction-processing system 1, the remake system 1' of the transaction-processing system 1 may relate to a minicomputer, to a mainframe computer, to a supercomputer, to an application software, to a computer program, to a computer process, a programmed field-programmable gate array FPGA, an application-specific integrated circuit ASIC, discrete electronic circuitry, etc. or any combination thereof configured to perform the functions of the remake system 1' as described in the present disclosure.

The electronic device 5 may relate to a minicomputer, to a mainframe computer, to a supercomputer, to an application software, to a computer program, to a computer process, a programmed field-programmable gate array FPGA, an application-specific integrated circuit ASIC, discrete electronic circuitry, etc. or any combination thereof configured to perform the functions and/or method steps as described in the present disclosure As schematically illustrated in FIG. 1, the data collector 51 for collecting data flowing into the transaction-processing system 1 and flowing out from the transaction-processing system 1 may be connected to one or more network interfaces of the transaction-processing system 1 enabling copying of data flowing into and out from the transaction-processing system 1. In a variant not illustrated in FIG. 1, the data collector 51 may be connected to system or program resources of the transaction-processing system 1, such as procedure calls, interprocess communications facilities, shared memory, tracing facilities (ptrace under Linux, SYSTRACE under z/OS, etc.), a logic analyzer connected to circuitry implementing transaction-processing system 1 (see U.S. Pat. No. 9,946,624), etc.

The electronic device 5 is configured to determine the transaction related messages 4. from the collected data, for example by discarding data not related to transactions C, such as network management or system management related data, by detecting known message headers or message contents identifying the messages 4., etc. In particular, the messages 4. may include a format such as an XML format (eXtended Markup Language), a JSON format (Javascript Object Notation), a CSV format (Comma Separated Values), a fixed binary record format, etc. according to a predefined specification enabling extraction of messages 4. related to transactions C.

Figure 1A:
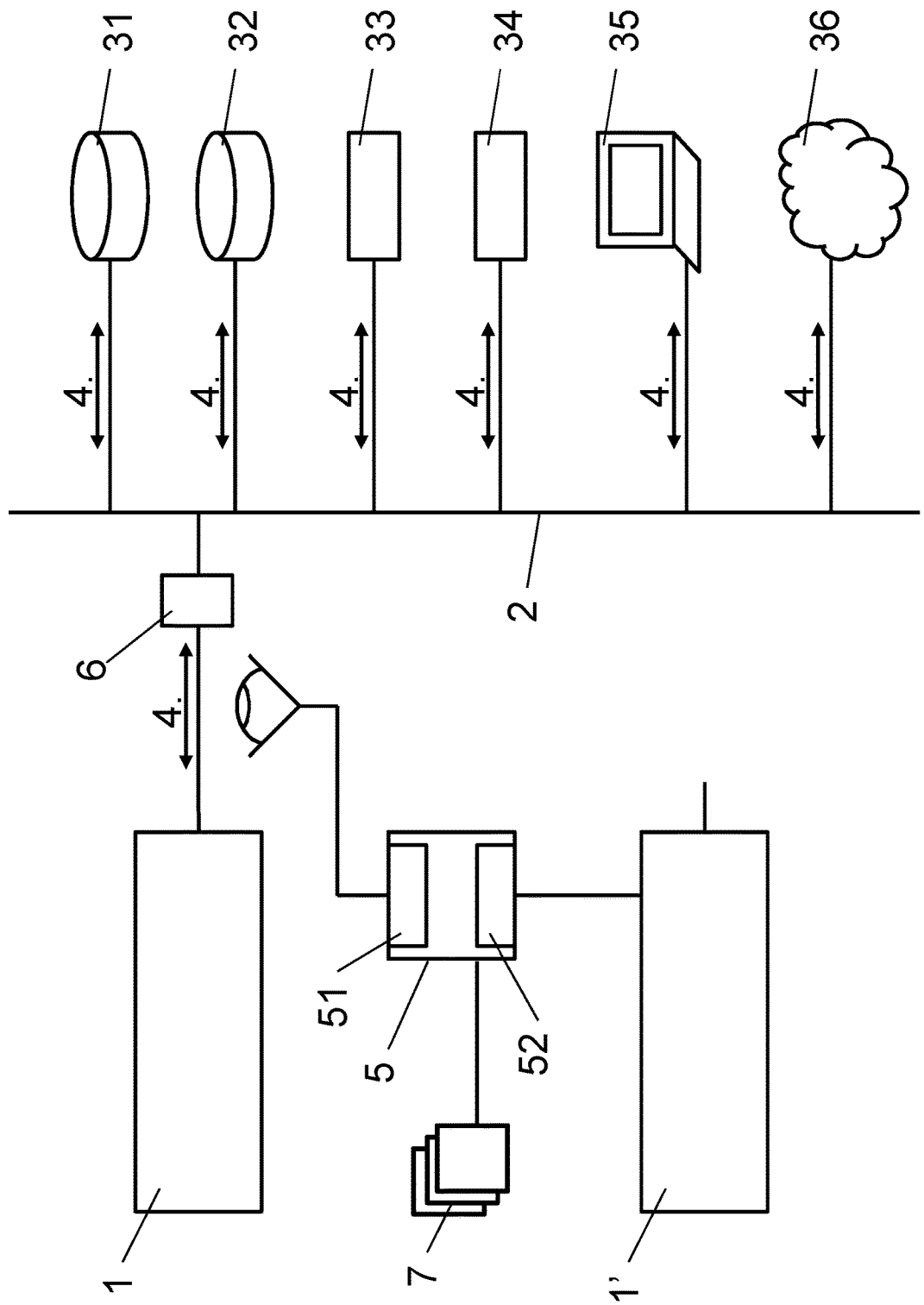
FIG. 1a illustrates a transaction-processing system connected via a sequentializer device to a network.

In one embodiment, electronic device 5 is installed with transaction-processing system 1 in a test environment. The test environment and transaction-processing system 1 are configured to process transactions in a strictly sequential manner, such that transaction order message 4o[n] initiating processing of transaction C[n] is only received after all transaction result messages 4r[n−1]. of previous transaction C[n−1] have been sent. In one embodiment (see FIG. 1a), a sequentializer device 6 is installed in between network 2 and transaction-processing system 1. Sequentializer device 6 is configured to store transaction order messages 4o. received from network 2 in a memory buffer being part of sequentializer device 6 before the message has been received by transaction-processing system 1, and to only forward stored transaction order message 4o. to transaction-processing system 1 upon receipt of an external trigger. Sequentializer device 6 may receive triggers such as a specific message from transaction-processing system 1 indicating that the processing of the previous transaction has been completed, or one of a number of transaction result messages 4r. which always indicate that the processing of the previous transaction has completed, or a signal indicating that a system process or system thread associated with processing the previous transaction has terminated.

Electronic device 5 thus collects copies of messages 4. flowing into transaction-processing system 1 and messages 4. flowing out of transaction-processing system 1, which can be unambiguously isolated into a sequence of input and output messages corresponding to the processing of transaction C, separated from sequences of messages corresponding to the processing of other transactions. A sequence of input messages and of output messages corresponding to the processing of transaction C is subsequently called single transaction message trace for C.

Other embodiments of electronic device 5 may obtain single transaction message traces for C by other means, particularly if strictly sequential execution of transactions with described sequentializer device 6 is not possible, e.g. when collecting message traces from a transaction-processing system in production, where the messages from the processing of different transactions are interleaved. Electronic device 5 may use an unambiguous identifier for its associated transaction C included with every message, either if transaction-processing system 1 already includes such an unambiguous identifier with every message, or if transaction-processing system 1 can be adapted to include such an unambiguous identifier for transaction C with every message. The electronic device 5 may also obtain single transaction message traces by analyzing correlations between data in messages 4. which indicate that the messages correspond to the processing of the same transaction C, etc.

The electronic device 5 may be configured to determine single transaction message traces through analyzing correlations between data in messages 4. by finding strong links between individual messages 4., and by then computing strongly linked clusters of messages 4., with each strongly linked cluster corresponding to a single transaction message trace. Two messages 4a. and 4b. are strongly linked iff 4a. is a received message, and 4b. a transmitted message, and one or more data values received with 4a. are transmitted with message 4b., i.e. the data in message 4a. is strongly correlated to the data in message 4b. The link between message 4a. and 4b. is the stronger the more discriminating the data values are, the closer messages 4a. and 4b. are in time, and the more such data value pairs there are. This concept of strong links builds on the fundamental nature of transaction-processing systems using rarely (among all messages) occurring identifiers such as unambiguous customer identifiers, account numbers, product identifiers, and highly distinguishing combinations of customer names, amounts, dates, the values of which are occurring in many messages 4. resulting from the processing of transaction C, and very rarely in messages resulting from the processing of other transactions.

European patent application No. 18197679.6 filed on 28 Sep. 2018 by the applicant Marc Brandis AG, which is included here by reference, discloses determining sets of collected messages associated with a single transaction for the case of a productive transaction-processing system where the messages from different transactions are interleaved. In other words, disclosed is an electronic device which may be configured to determine a single transaction message trace for transaction C as a strongly linked cluster of messages using a greedy algorithm as follows: The electronic device traverses all collected messages, finding data values that appear in multiple messages, and storing links between multiple messages including the same data values. Each stored link includes a strength attribute, with the strength attribute being set the higher, the fewer occurrences of the data value there are (i.e. the more discriminating the data value is), the closer the messages are in time, and the more such equal data values are included in the linked messages. Having established all strong links between messages 4., the electronic device then assigns each transaction order message 4o. to a separate cluster, based on each single transaction message trace including exactly one transaction order message. The electronic device then performs a breadth-first-traversal of strongly linked messages for every cluster, assigning visited messages that are not yet assigned to a cluster to the cluster it has the strongest sum of links with, such that every message is assigned to exactly one cluster. Every cluster represents a single transaction trace. It should be noted that due to the nature of the "strong link" concept, messages that include strongly correlated values but are not associated with the same transaction C may be assigned to the same cluster and the same single transaction trace. Such errors in the pre-processing of the data lie in the very nature of machine-learning mechanisms and occur rarely with electronic device processing large input- and output-traces. Further processing in electronic device may find such errors to be outliers (e.g. representing sequences of messages occurring only once in hundreds of thousands of single transaction message traces) and ignore them, or revisit them.

In an embodiment, electronic device 5 may be configured to use a linear programming algorithm (see Jiří Matoušek, Bernd Gärtner, "Understanding and Using Linear Programming", Section 3.2 Maximum-Weight Matching, Springer Verlag Berlin Heidelberg 2007, ISBN-13 978-3-540-30697-9) to determine a single transaction message trace as a strongly linked cluster of messages. The electronic device 5 first establishes all strong links between messages 4. as set out above for the greedy algorithm. It then creates the bipartite graph used in the cited algorithm, with all transaction order messages 4o. being in one partition and all other messages 4n. being in the other. The electronic device 5 calculates the scores between any element in the first partition (i.e. transaction order messages 4o.) and any element in the second partition (i.e. other messages 4n.) as the sum of the strengths of all paths from 4n. to 4o. following strong links, where the strength of a path from 4n. to 4o. through other messages 4. being defined as the product of the strengths of all strong links along the path. The Maximum-Weight Matching algorithm described in the reference finds an optimal selection of associations between elements in the first partition (i.e. transaction order messages 4o.) and elements in the second partition (i.e. other messages 4n.) by maximizing the sum of the scores of all selected associations, subject to constraints that every message 4n. in the second partition can only be associated with one message 4o. in the first partition. The constraints used for determining single transaction message traces differ from those described in the reference as follows: While the cited algorithm restricts that there is only one association for every element of either partition, determining single transaction messages traces demands that the restriction only be applied to the second partition of messages 4*n*., such that a message 4*n*. can only be associated with one transaction C and thus one transaction order message 4*o*., but every transaction order message 4*o*. in the first partition can be associated with multiple messages 4*n*. in the second partition. Other configurations of electronic devices determining strongly linked clusters of messages are possible.

Figure 2A:
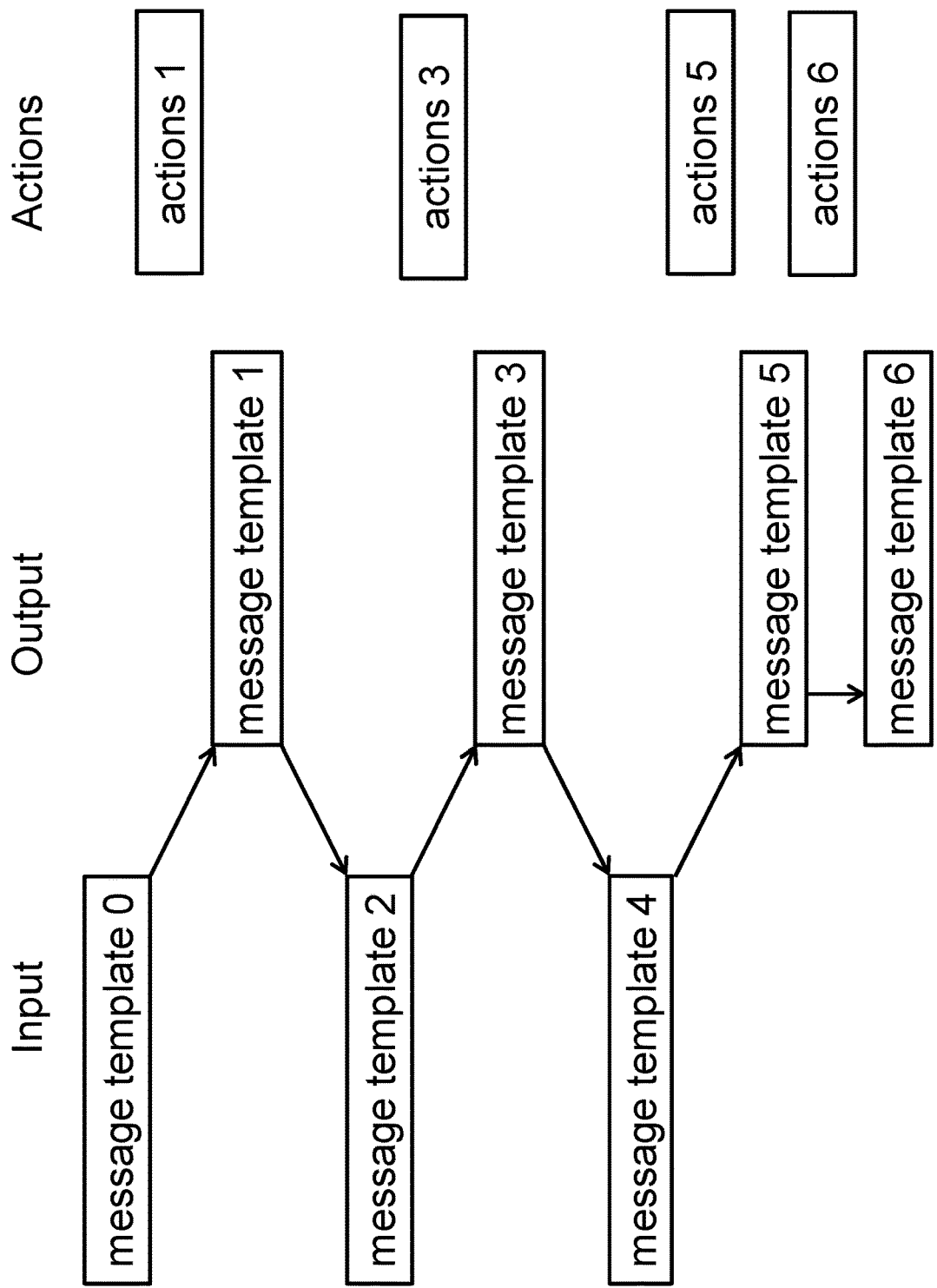
FIG. 2a illustrates schematically a transaction template.

Electronic device 5 is further configured to determine a set of transaction templates from the set of single transaction message traces. A transaction template includes a set of ordered message templates to be received or transmitted, and a set of actions defining how output message data fields may be determined from input data fields (see FIG. 2*a*, which illustrates message templates 0-6 and actions 1, 3, 5, and 6). Such transaction templates are suited for execution on a generic transaction-processing system (see FIG. 2*b*), effectively remaking respective functions of transaction system 1 in that the generic transaction-processing system configured using the determined transaction templates will generate the same sets of output messages when receiving the same set of input messages as transaction system 1.

A message of the transaction-processing system 1 or a message template may include one or more of the following attributes: being an input message, being an output message, being an order message, the interface identifier through which it has been transmitted, the number of data fields it includes, and for each field which data type it has (e.g. "text string", "number", "boolean").

Generic transaction-processing system (see FIG. 2*b*) includes a state machine processor 8, a memory device 9 for storing data related to the processing of each transaction C, access to libraries 7 of transformation functions and application-domain specific functions, non-transitory memory to store ACTIONS table 10 configuring the state machine processor 8 which actions to perform at a specific state of the state machine, and non-transitory memory to store TRANSITIONS table 11 configuring the state machine processor 8 which transitions of states to follow when processing a transaction. The ACTIONS table 10 and the TRANSITIONS table 11 have been generated by electronic device 5, as described below in connection with FIG. 2*d, e*.

The state machine processor 8 includes a (generic) finite state transducer 81 and a tightly integrated (generic) data flow and transformation engine 82.

The data flow and transformation engine 82 is configured to execute actions designed to receive input messages 4.' from network 2 and store them in memory device 9 for later access (i.e. RECEIVE action). The data flow and transformation engine 82 is further configured to generate output messages by populating output message fields in memory device 9 with constant values (i.e. CONST action), copied values from an input message field (i.e. COPY action), or values obtained from calling functions in the libraries 7 of transformation functions or of application-domain specific functions. It is further configured to transmit generated output messages stored in memory device 9 onto network 2 (i.e. SEND action). The data flow and transformation engine 82 is further configured to evaluate predicates on input message fields, constant values, or other predicates by applying standard relational operators (i.e. "=", "<", "<=", ">", ">=", "< >" actions) or Boolean operators (i.e. "AND", "OR", "XOR", "NOT" actions) or by calling functions in the libraries 7 of transformation functions and of application-domain specific functions, and to store the resulting Boolean value in memory device 9. This stored Boolean value is designed for later use in the determination of further predicates, or for use by the finite state transducer 81 in selecting paths to be taken through the state machine.

The finite state transducer 81 transduces received messages for transaction C into a set of actions designed for processing by data flow and transformation engine 82, selecting the path through the state machine to be taken for transaction C based on predicate values determined by data flow and transformation engine 82 based on data associated with transaction C as set out above. The finite state transducer 81 accesses the ACTIONS table 10 to determine the actions to be executed by data flow and transformation engine 82, and the TRANSITIONS table 11 to determine which path to follow through the state machine based on the current state and predicate values stored in memory device 9, with the ACTIONS table 10 and TRANSITIONS table 11 having been generated by electronic device 5. As a person skilled in the art will recognize, the combination of determining predicate values on input values combined with a finite state transducer 81 using these predicates enables to build the workflow part of the remake system 1', while the data flow and transformation engine 82 executing actions generating output data fields enables to build the data transformation part of the remake system 1'.

The data related to the processing of each transaction C stored in the memory device includes a current state identifier for transaction C indicating up to which state processing of transaction C has progressed, all input and output messages 4*o*., 4*q*., 4*y*., and 4*r*. related to transaction C, and a set of Boolean predicates associated with transaction C. The memory device stores a separate set of such data for each transaction C0, C1, C2, . . . Cn.

The Boolean predicates stored for each transaction C control the path taken through the state machine, in that every transition from a state having state identifier Sa, for example, to a state having state identifier Sb, for example, is only available if its associated Boolean predicate P is TRUE. As set out above, data flow and transformation engine 82 determines the value of predicate P for transaction C during processing of transaction C, stores the resulting Boolean value in the memory device 9, and finite state transducer 81 retrieves it from the memory device 9 when determining available transitions from the current state to a successor state.

The calculation of Boolean predicate P may include the comparison of two input data fields, e.g. comparing whether the debit account and the credit account in a financial transaction have an unequal currency code, in which case a currency conversion will be required, a different set of actions will have to be executed compared to the case in which no conversion is required, and thus a different path through the state machine will have to be taken. The calculation of Boolean predicate P may also include a comparison of an input data field with a constant value, e.g. comparing whether in a wire transfer payment transaction, the destination bank has the same identifier as the bank executing the transaction, such that no communication with a third party bank will be needed.

Figure 2C:
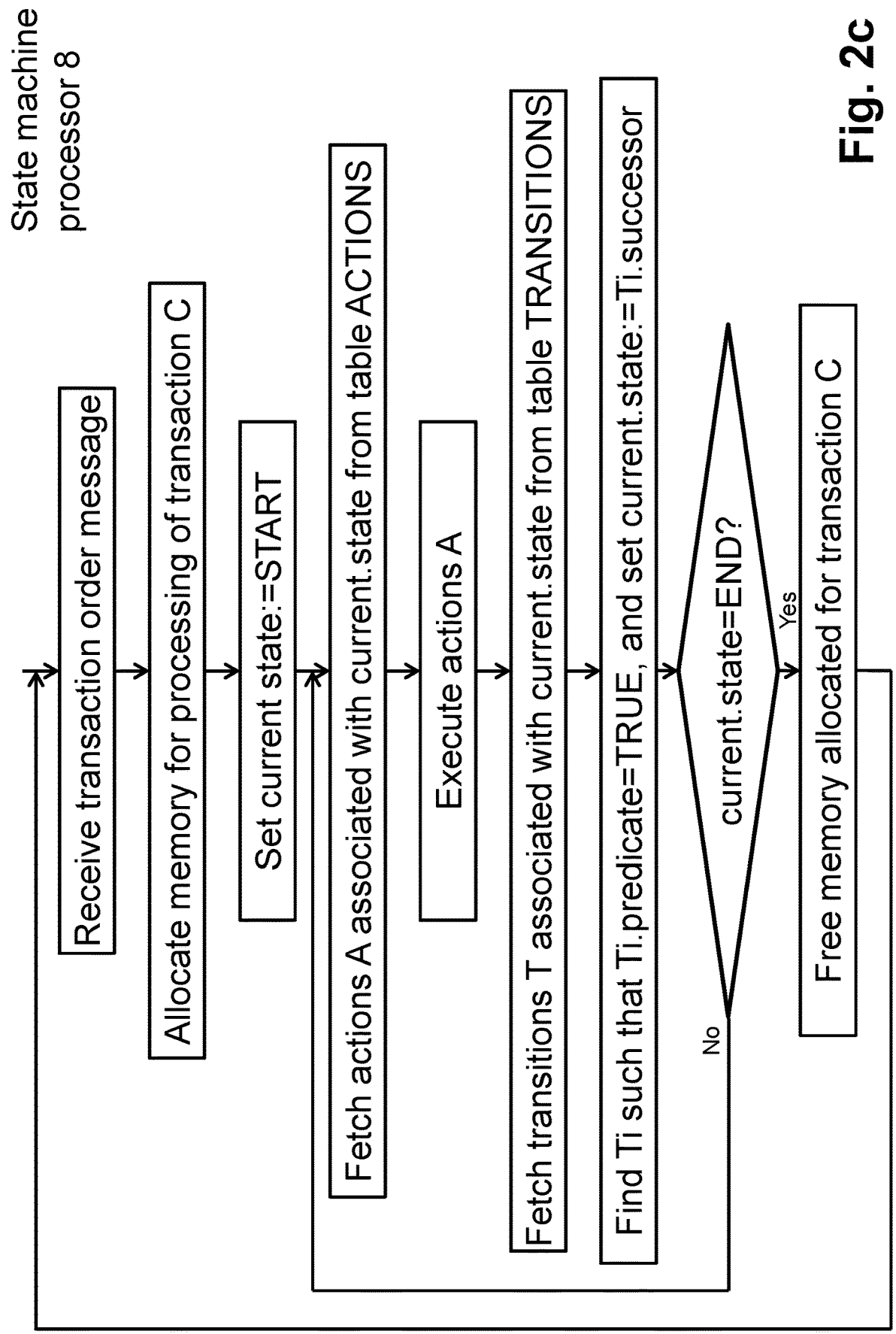
FIG. 2c illustrates schematically a flow diagram of a state machine generating the output messages for the same input messages as a transaction-processing system.
Figure 2D:
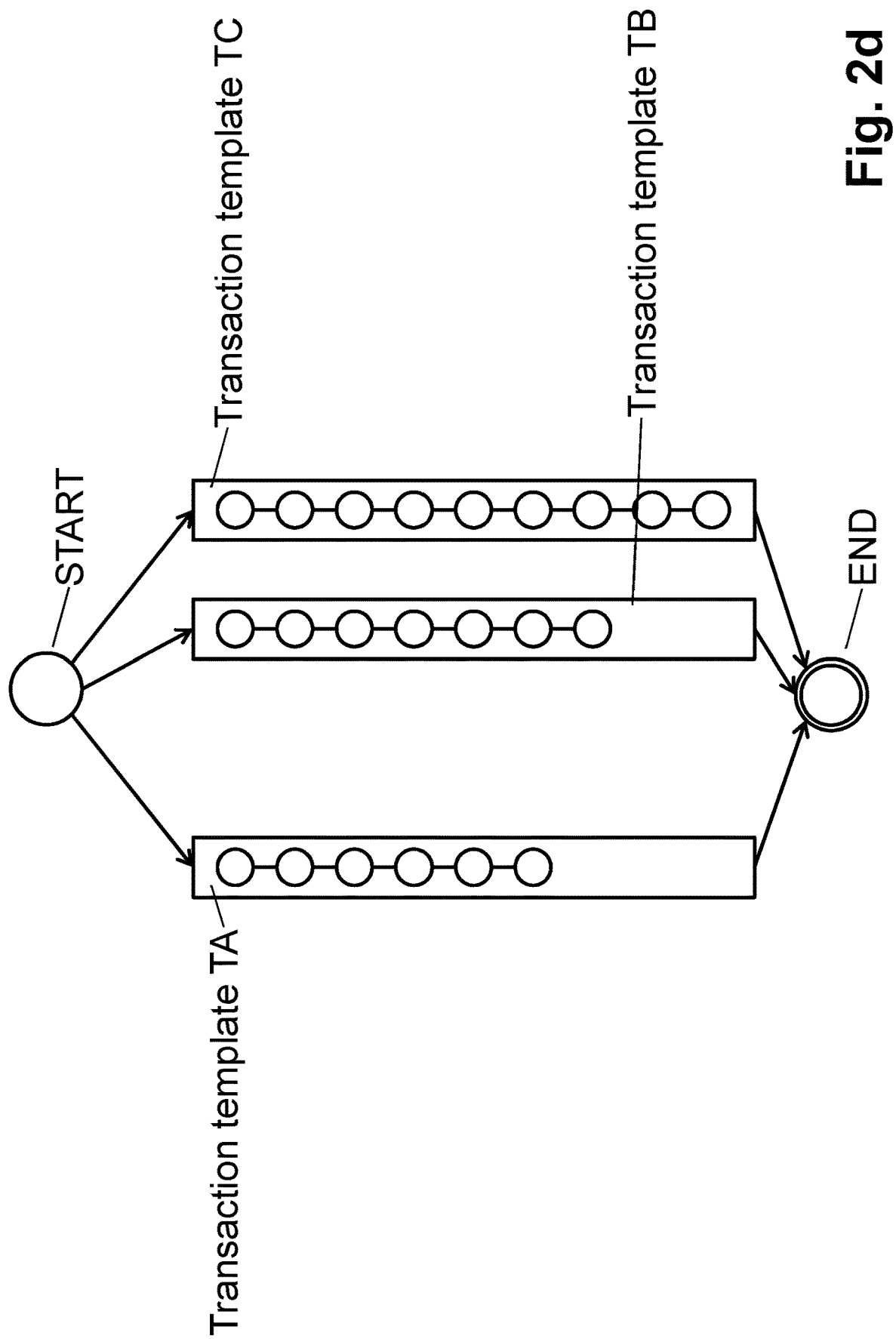
FIG. 2d illustrates schematically a state machine able to remake all functionality for all transaction templates.

State machine processor 8 is configured to generate the same output messages for the same input messages as transaction-processing system 1 as described in the flow diagram of FIG. 2*c*. State machine processor waits to receive a transaction order message 4*o*. on network 2. Upon receipt of the transaction order message 4*o*., state machine processor allocates space in the memory device 9 to store all data associated with the processing of related transaction C, and sets field "current_state" associated with transaction C in the memory device 9 to the identifier of state START, indicating that processing of transaction C has been progressed up to START. The finite state transducer 81 included with state machine processor 8 then enters into a loop executing actions and transitioning into other states, until it has reached the END state (i.e. current_state=END), indicating that the processing of transaction C is complete. In this loop, finite state transducer 81 fetches all actions A associated with current_state from the ACTIONS table 10, and passes them to data flow and transformation engine 82 for execution. The finite state transducer 81 then fetches transitions T associated with current_state from the TRANSITIONS table 11, and searches for a transition Ti for which the associated predicate indicated by Ti has a value of TRUE stored in memory device 9 for transaction C. The finite state transducer 81 transitions to the state indicated by Ti by setting current_state to the successor state as stored with Ti. The TRANSITIONS table 11 is filled such that for every state except for state END, there is always exactly one Ti, such that the predicate indicated by Ti has a value of TRUE, and all others having a value of FALSE. State END does not have a successor state and thus stores the pair <NULL, FALSE> as transition T, indicating that there is no successor.

State machine processor 8 thus achieves that for a transaction C, a sequence of states from state START until state END is followed, and all actions associated with this sequence of states are being executed. State machine processor 8 configured with ACTIONS table 10 and TRANSITIONS table 11 determined by electronic device 5 in the analysis of transaction-processing system 1 performs actions designed to generate the same output messages for the same input messages as transaction-processing system 1 would, establishing a remake system 1'. The state machine processor 8 implements a state machine which is defined by the data stored in ACTIONS table 10 and in TRANSITIONS table 11.

In one embodiment, electronic device 5 is configured to determine transaction templates as follows: For each single transaction trace, it searches for how the values in the data fields of the output messages might have been computed from the values in the data fields of the previous input messages within the same single transaction trace. In many transaction-processing systems, output data fields are populated with copies of input data fields (such as customer identifiers, account numbers, product numbers, etc.), results of standard transformations on input data fields (such as replacing a date in mm/dd/yyyy format by a number representing the number of days since Dec. 31, 1899 used by Microsoft Excel formats, or appending multiple input data fields in order to create a unique order identifier), or results of application-domain specific functions on input data fields (such as calculating payable interest amount based on interest rate, principal amount, and duration in banking). Electronic device 5 is configured to try out for each output data field calculating it by copying previous input data fields, calculating it by applying a set of standard transformations on previous input data fields, or calculating it by applying application-domain specific functions on previous input data fields. In cases where copying or applying a standard transformation or an application-domain specific function on input data fields yields the same data value as stored in the output data field, electronic device 5 stores the tuple <output data field, operation, input data fields> as a potential action transaction-processing system 1 may have taken in processing transaction C, and which may also be taken by the remake system 1'. Electronic device 5 includes a selection of such stored tuples indicating actions when generating ACTIONS table 10, as set out below. Electronic device 5 obtains standard transformations and application-domain specific functions as libraries 7 of functions accessible by electronic device 5, e.g. as program code executable by electronic device 5, as program library callable by electronic device 5, as function implemented by another system and accessible by electronic device 5, or as circuitry implementing the function and connected to electronic device 5. Electronic device 5 may be configured to use additional libraries. Libraries may be in a form accessible by the remake system 1' or storable on the remake system 1'.

Additional libraries 7 of standard functions or application specific functions may be obtained using other machine-learning mechanisms (e.g. regression functions implemented by a convolutional neural network trained using supervised deep-learning), statistical analysis of inputs and outputs (e.g. finding perfect correlations between input and output values, where an input value always map to the same output value), or by accessing software code libraries including relevant data transformation functions or application-domain specific functions. It is expected that the use of electronic device 5 in a new application domain will require the use of libraries with application-specific functions.

Electronic device 5 is further configured to extract common transaction templates T for transactions C. Two transactions C1 and C2 follow the same transaction template, iff they have the same sequence of input and output message templates, and iff there are no conflicting potential actions collected in the previous step. Message templates are the same iff they have the same number of data fields, and each data field has the same data type in both message templates (e.g. text string, or number, or date, or other data types used by transaction-processing system 1). Potential actions between C1 and C2 are not in conflict iff for every output field Oj, there is at least one action calculating Oj that is part of both potential action sets for C1 and C2, or if field Oj has the same value for C1 and C2. Intuitively, C1 and C2 following the same transaction template means that they receive and send the same types of messages in the same sequence, and every output data field can be calculated in the same way for C1 and for C2 (by applying a common action or by setting the output data field to the (constant) value seen in all transactions C associated with transaction template T). A state machine remaking transaction-processing system 1 could thus perform the same sequence of steps (receiving messages, sending messages, calculating output data fields from input data fields) when remaking the functionality for C1 and for C2.

Electronic device 5 may in one embodiment search for each transaction C1 being congruent with any other transaction C2, C3, . . . Cn in the sense of having the same sequence of input and output message templates and no conflicting potential actions, and associate congruent transactions with a common transaction template Tj, until all transactions C have been associated. Electronic device 5 may find such common transaction templates by comparing the transaction template for each transaction C with the transaction templates for all transactions other than C. In another embodiment, electronic device 5 may use other commonly known algorithms to find congruent data.

Electronic device 5 is further configured to determine a state machine N able to remake all functionality for all transaction templates TA, TB, TC, TD, . . . (see FIG. 2d). It creates a start state START. For each transaction template TA, TB, TC, TD, . . . , it creates a sequence of states, which it places between START and END. Every message received in a transaction template yields a state with associated action "RECEIVE message X from interface", and every message sent in a transaction template yields a state with associated action "SEND message Y to interface". For all states including a "SEND" action, electronic device 5 adds actions to calculate all data fields of the message to be sent from input data fields from the set of potential actions determined before (i.e. "COPY", "CONST", or calls to functions from the libraries 7 of transformation functions or application-domain specific functions).

Resulting state machine N is a non-deterministic finite automaton (NFA), covering all transaction templates T, and in principle enabling to remake transaction-processing system 1 so that upon reception of a transaction order message 4o., the remake system 1' provides the same set of output messages as the original system. However, after receiving transaction order message 4o. in state START, N cannot determine which of the many available paths to follow (non-determinism).

Figure 2E:
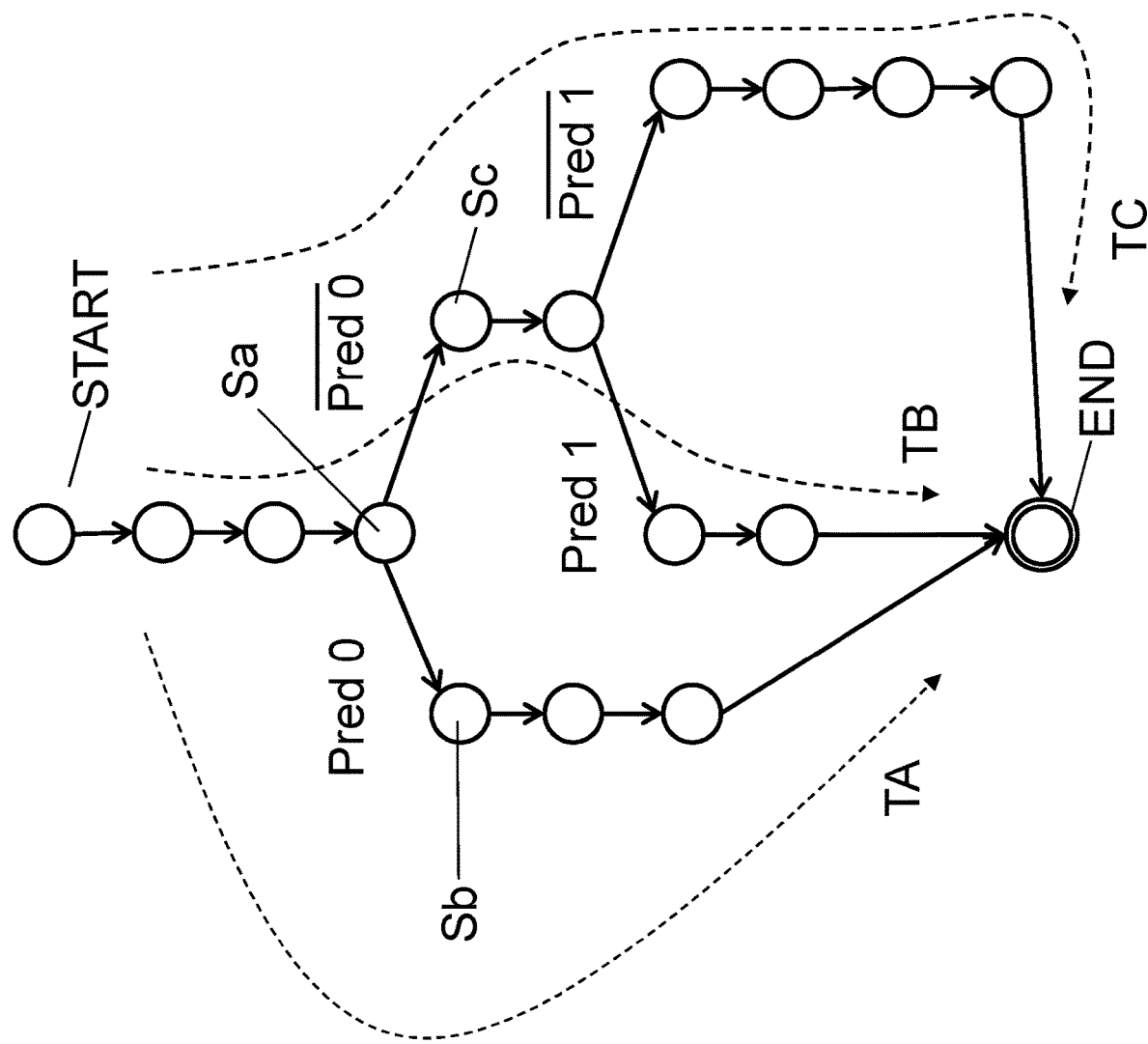
FIG. 2e illustrates schematically the state machine of FIG. 2d being transformed into a deterministic finite automaton.

Electronic device 5 is further configured to transform state machine N into a deterministic finite automaton D (see FIG. 2e) using algorithms derived from "Alfred V. Aho, Monica S. Lam, Ravi Sethi, Jeffrey D. Ullman, 'Compilers—Principles, Techniques, and Tools', Section 3.7, Second Edition, Pearson Education Limited 2014, ISBN 13: 978-1-292-02434-9", resulting in a state machine deterministically selecting paths to follow based on predicates calculated on input values received. Starting from state START, it determines whether two or more subsequent states S have the same actions associated with them such that merging the states would not result in different actions being taken. In other words, if the same actions are taken on different paths, the paths do not have to be different, and the respective states can be combined into one. It thus merges such states into one state, with that state having all successor states of merged states as successors. In other words, the successors of all merged states will be kept on separate paths. The successor states of the merged states are subject to being analyzed subsequently, whether they also have the same actions associated with them or not. Eventually, there will be differences in between associated actions further down these paths, as otherwise the transaction templates would not have been separated, as by definition of the algorithm determining transactions templates described above.

Intuitively, this algorithm pushes branching of paths from START towards END. This process is iterated until all states have been visited, and the degree of branching has been reduced, and branching has been pushed towards END as much as possible.

For the remaining branches, electronic device 5 is configured to determine predicates on all previous input data fields, based on which the state machine can make decisions about which path to follow. For some state Sa, there might be different successor states Sb and Sc, with Sb having been established by transaction templates TA and Sc by transaction templates TB and TC. The generated state machine shall transit to Sb in all cases in which TA would have been applied, i.e. for all transactions C having been associated with TA, and not for any transactions C having been associated with TB or TC. Electronic device 5 thus searches for a predicate Pb on input data values, which is TRUE for all transactions C associated with TA, and FALSE for all transactions C associated with TB or TC. It also searches for such predicate Pc for Sc. During later execution, state machine D may thus transition from Sa to Sb if Pb is TRUE, and from Sa to Sc if Pc is TRUE. In other words, executing state machine D will provide for the same outputs as the original transaction-processing system for the same inputs.

The path taken for other inputs not included in the collected input data traces depends strongly on the choice of predicates (the so-called "generalization" problem in machine learning, i.e. how to generalize from a set of observed data inputs and outputs to a general mechanism). In one embodiment, electronic device 5 choses among multiple possible predicates for Pb, with all such predicates for Pb fulfilling that it is TRUE for all transactions C associated with transaction template TA, and FALSE for all transactions C associated with transaction templates TB or TC by selecting the most simple predicate, i.e. any one of those having the least number of terms (comparisons of input data fields, AND, OR, EXCLUSIVE-OR, NOT operations). Other embodiments may use other heuristics for choosing among multiple possible predicates.

The calculation of predicates P may include comparing the value in an input data field for equality to some constant (e.g. a currency data field being equal to "USD"), or for being out of a small set of values, or for being less than a threshold value (e.g. less than 10'000), or the value of two input data fields being equal (e.g. the debit currency field and the credit currency field having the same value in a financial transaction, such that no currency conversion will be needed), or any Boolean combination of them (i.e. using AND, OR, EXCLUSIVE-OR, and NOT Boolean operators). Electronic device 5 uses the same mechanisms described above for finding potential actions calculating output message fields to find potential predicates, accessing Boolean functions available in libraries 7 of transformation functions and of application-domain specific functions.

If there are multiple potential actions on how to calculate a single output field, the algorithm chooses one of the potential actions. In one embodiment, electronic device 5 choses the most simple possible action, with simplicity of the action being defined as having the least parameters and being the most simple function, with the CONST function considered to be the most simple, followed by the COPY function, followed by transformation functions from libraries 7 of transformation functions, followed by application-domain specific functions from libraries 7 of application-domain specific functions. If there are multiple possible actions with the same minimal simplicity, it chooses the one with input parameters having appeared the earliest, or any one of the remaining actions to choose from. Other heuristics for choosing among possible actions are possible.

To complete deterministic finite automaton D, electronic device 5 adds actions to calculate used predicates in states having multiple successors, and stores which predicates have to be fulfilled for each path at each branch in D.

In one embodiment, electronic device 5 may store finite automaton D on a non-transitory computer readable storage medium as an ACTIONS table 10 indexed by state identifier (each state defined in accordance to the finite automaton D has assigned a state identifier), where accessing the table with the current state identifier as index gives access to the actions associated with the current state, and a TRANSITIONS table 11 indexed by state identifier, where accessing the table with the current state identifier as index gives access to a list of successor state identifiers and the associated predicates for the transition from the current state to the successor state. The generic transaction processing system illustrated in FIGS. 2b and 2c configured to access these ACTIONS table 10 and TRANSITIONS table 11 provides for a remake system 1' in the sense that it will generate the same output messages for the same input messages as original transaction-processing system 1 does. Other embodiments of remake system 1' include an executable program for a general purpose microprocessor stored in non-transitory memory, compiled from ACTIONS table 10 and TRANSITIONS table 11, a set of functions implementing a generic finite state transducer, a set of functions implementing a data flow and transformation engine including SEND, RECEIVE, CONST, and COPY functions as well as relational operators and Boolean operators, and the accessed functions from the libraries of transformation functions and of application-domain specific functions. Other embodiments of remake system 1' include a hardware configuration for a field-programmable gate array FPGA compiled from above ACTIONS table 10 and TRANSITIONS table 11, a set of hardware configuration libraries implementing a finite state transducer, a set of hardware configuration libraries implementing a data flow and transformation engine including SEND, RECEIVE, CONST, and COPY functions as well as relational operators and Boolean operators, and the accessed functions from the libraries of transformation functions and of application-domain specific functions. Other embodiments of remake system 1' include the implementation of identified FPGA hardware configuration as an application-specific integrated circuit ASIC.

Depending on the attributes of transaction-processing system 1, electronic device 5 may not find actions calculating all output data fields or predicates for all branches in state machine D. Electronic device 5 is configured to provide notification of such instances to the outside, indicating that the result from electronic device 5 is only a partial remake system 1' of transaction-processing system 1. Electronic device 5 may receive input on additional libraries of transformation functions or application-domain specific functions or predicates to access, or instructions to collect further input and output message traces from running transaction-processing system 1, and then re-run the analysis, reducing the number of instances in which original transaction-processing system 1 could not be completely remade. Electronic device 5 may iterate this process until all relevant parts of transaction-processing system 1 are covered by remake system 1'.

As a person experienced in the art will recognize, further optimizations of the state machine, the actions, and predicates are possible.

The situation may arise that the remake system 1' generates output messages differing from output messages from transaction-processing system 1 for the same transaction order message 4o., which would be due to choices made in selecting actions and/or predicates for D, which are not matching the effective logic implemented by transaction-processing system 1. The likelihood may be reduced by collecting data from the processing of a large set of transactions on transaction-processing system 1 (as in general in machine-learning applications), or by operating the remake system 1' in parallel to transaction-processing system 1, processing each transaction order message 4o. in both systems, comparing differences in the output, and using the collected messages from transactions yielding such differences in further analyses of electronic device 5 adapting state machine D so that it also processes these cases identically (see FIG. 3 and further descriptions below).

Electronic device 5 is further configured to operate the generated remake system 1' in parallel to the original transaction-processing system 1, providing the same transaction order messages to both original and the remake system 1', collecting the resulting request/reply messages or transaction result messages from both systems, comparing them for differences, and recording any differences for a rerun of the analysis on electronic device 5 in order to adjust the configuration parameters for the generic transaction-processing system, which implements the remake system 1', to eliminate the differences in output between the two systems. It should be noted that either of the systems can be operating as "live" system effectively processing the transactions, with the other operating as shadow system allowing to detect anomalies, and to stop transactions showing anomalies.

In a variant, electronic device 5 may output the recorded differences in machine- or human-readable format and receive instructions on how to adapt remake system 1' from either an external device not described here or from a human operator.

The electronic device 5 is configured to generate a specification of the remake system 1' on the basis of the determined transactions C. The specification of the remake system 1', which is based on the ACTIONS table 10 and the TRANSITIONS table 11 as described above, may relate to a software application for running the remake system 1' of the transaction-processing system 1 on a general purpose computer, a mainframe computer, a supercomputer, etc. The specification may enable manufacturing of the remake system 1' in the form of a field programmable gate array FPGA, an application-specific integrated circuit ASIC, or discrete electronic circuitry, etc.

Figure 3:
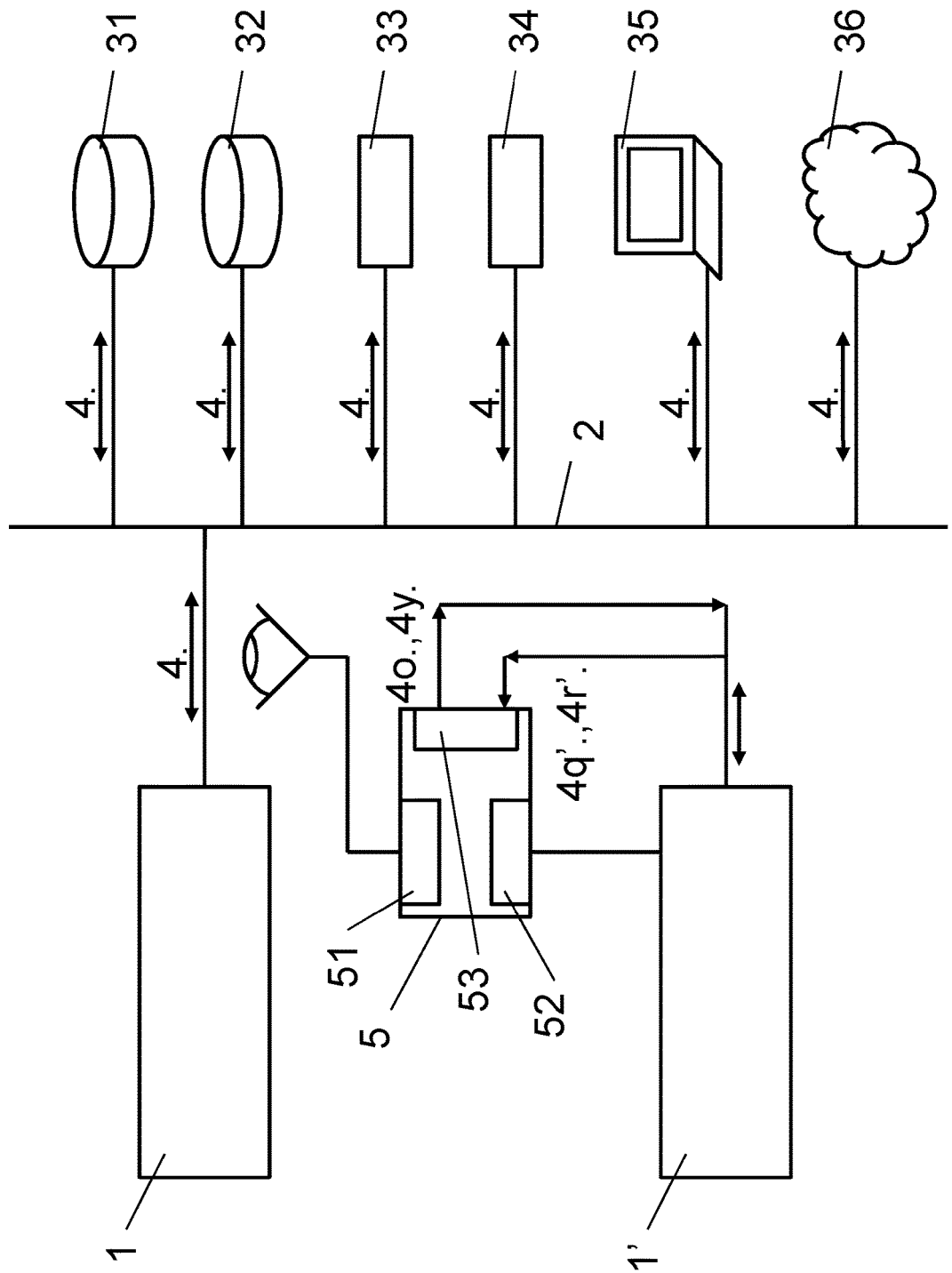
FIG. 3 illustrates schematically updating a remake system in accordance to differences between transaction related messages of the running transaction-processing system and transaction related messages of the remake system.

FIG. 3 illustrates schematically a transaction-processing system 1 connected to the network 2. The remake system is not connected to the network 2. Because the remake system 1' is based on a set of particular messages 4., the remake system 1' may not yet be enabled for processing all possible transactions C. The electronic device 5 therefore includes a difference module 53 which is configured to transmit order messages 4o. and reply messages 4y. collected by data collector 51 to the remake system 1' and to receive request messages 4q'. and transaction result messages 4r'. from the remake system 1'. The difference module 53 is further configured to determine differences between the request messages 4q./transaction result messages 4r. of the transaction-processing system 1 and the request messages 4q'./transaction result messages 4r'. of the remake system 1' and to control the remake builder 52 in order to update the remake system 1' accordingly, thereby adapting the remake system 1' to the transaction-processing system 1.

Figure 4:
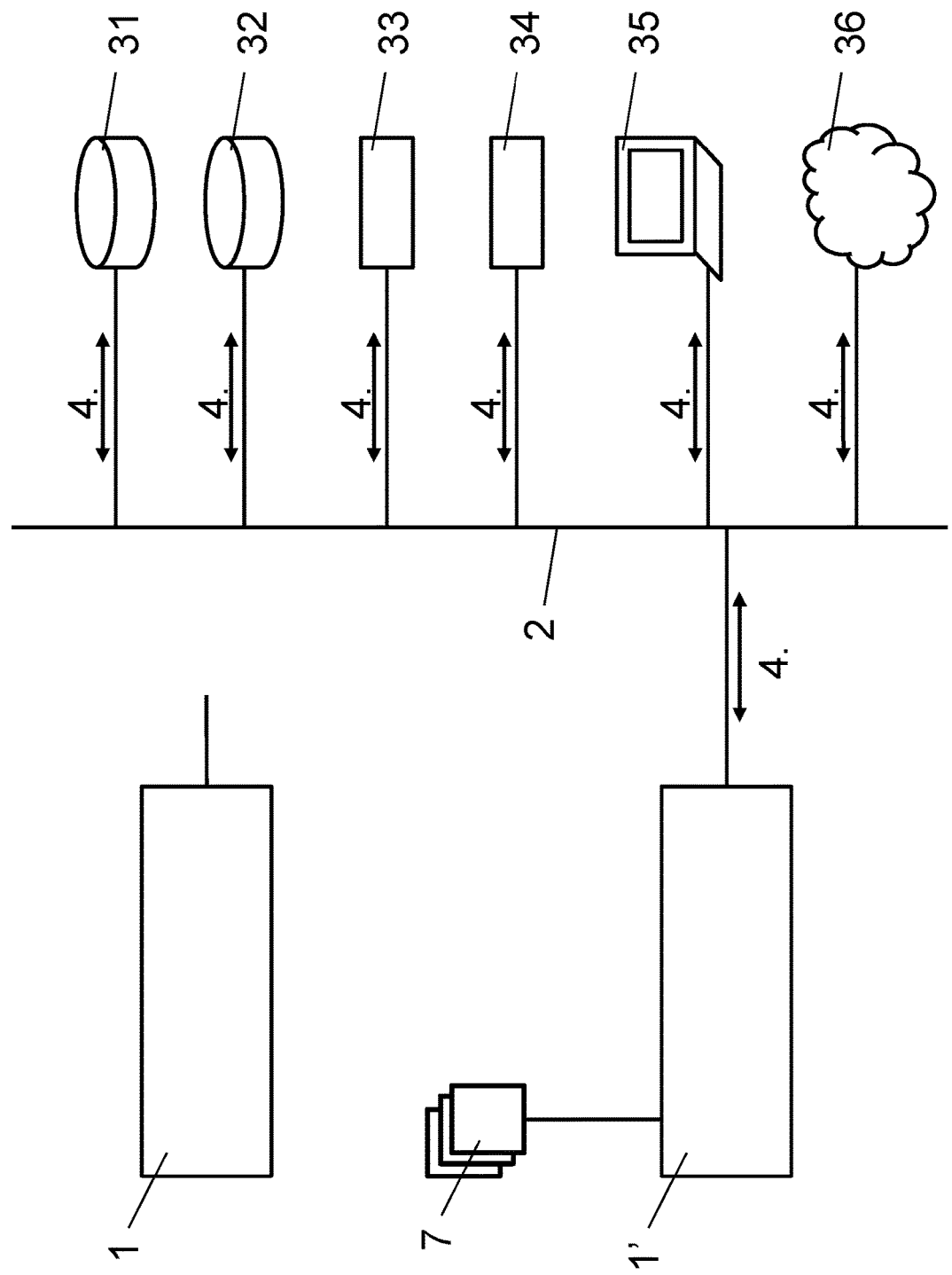
FIG. 4 illustrates schematically a remake system of a transaction-processing system, the remake system being connected to the network and the transaction-processing system being disconnected from the network.

FIG. 4 illustrates schematically a remake system 1' of the transaction-processing system 1. The remake system 1' is connected to the network 2. The transaction-processing system 1 is not connected to the network 2. The electronic device 5 is removed. Thus, the remake system 1' has taken over processing of all transactions C.

FIG. 5 illustrates schematically a remake system 1' of the transaction-processing system 1, installed in a test environment E' for testing one of the systems 33-36 interacting with the transaction-processing system 1. FIG. 5 illustrates the example of an auxiliary system 34, which was moved into the test environment E'. Auxiliary system 34 continues to interact with the systems 31-33, 35-36 and requires interaction with transaction-processing system 1. However, in the test environment E' transaction-processing system 1 is not available, which is indicated in FIG. 5 by the transaction-processing system 1 being disconnected from network 2. In the test environment E', interaction with the transaction-processing system 1 is replaced by the remake system 1'. Remake system 1' takes on the role of transaction-processing system 1 in the test environment E' for auxiliary system 34, receiving and sending the same messages from and to auxiliary system 34 and other systems 31-33, 35-36 as transaction-processing system 1 would, without transaction-processing system 1 being in place. For the purpose of testing auxiliary system 34, not all functionality of transaction-processing system 1 may be needed, such that a partial remake system 1' of transaction-processing system 1 may be used, reducing the required hardware resources in the test environment E' and reducing the efforts needed to create the remake system 1'.

Figure 9:
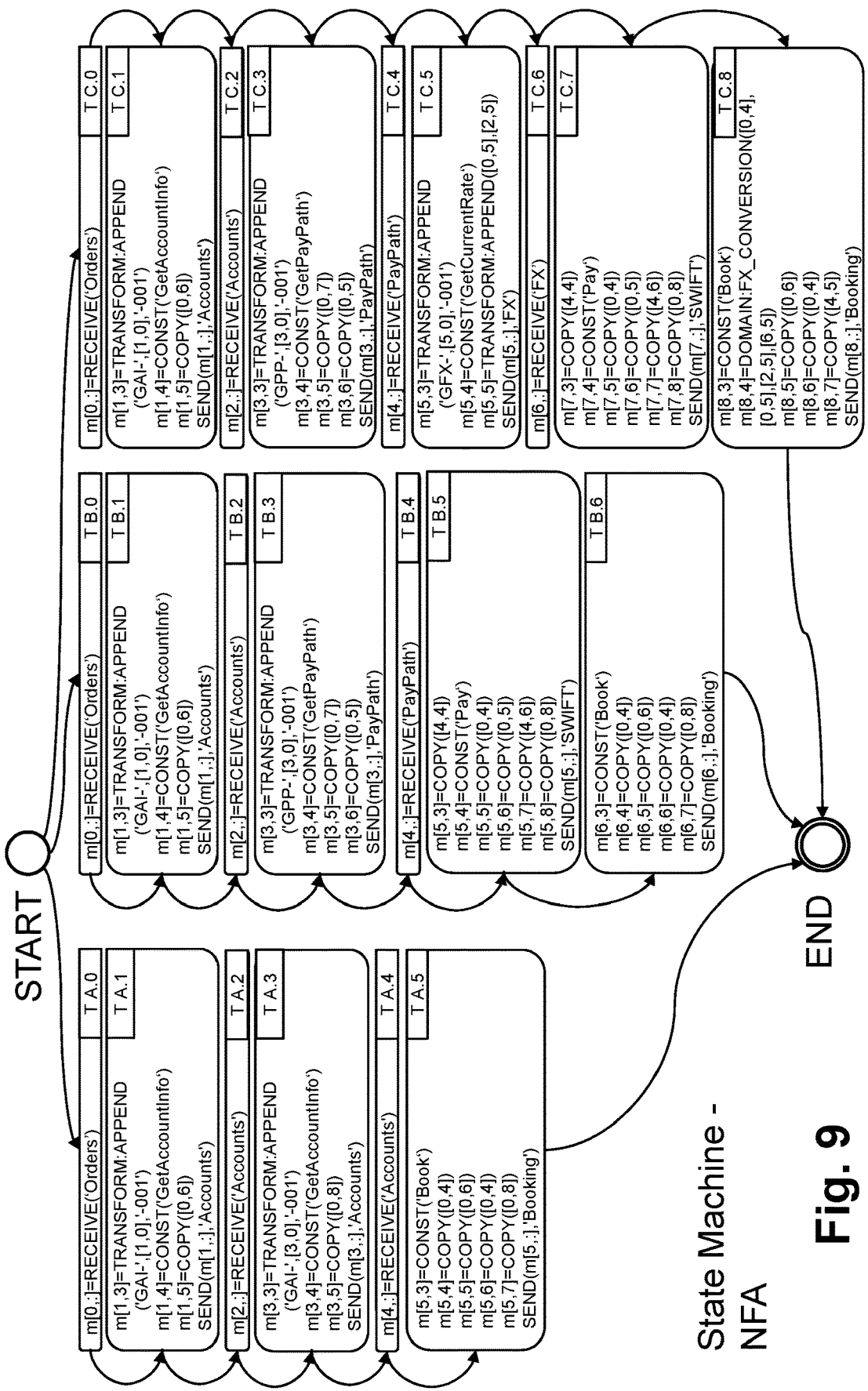
FIG. 9 illustrates schematically a state machine in the form of a non-deterministic finite automaton (NFA)
Figure 10:
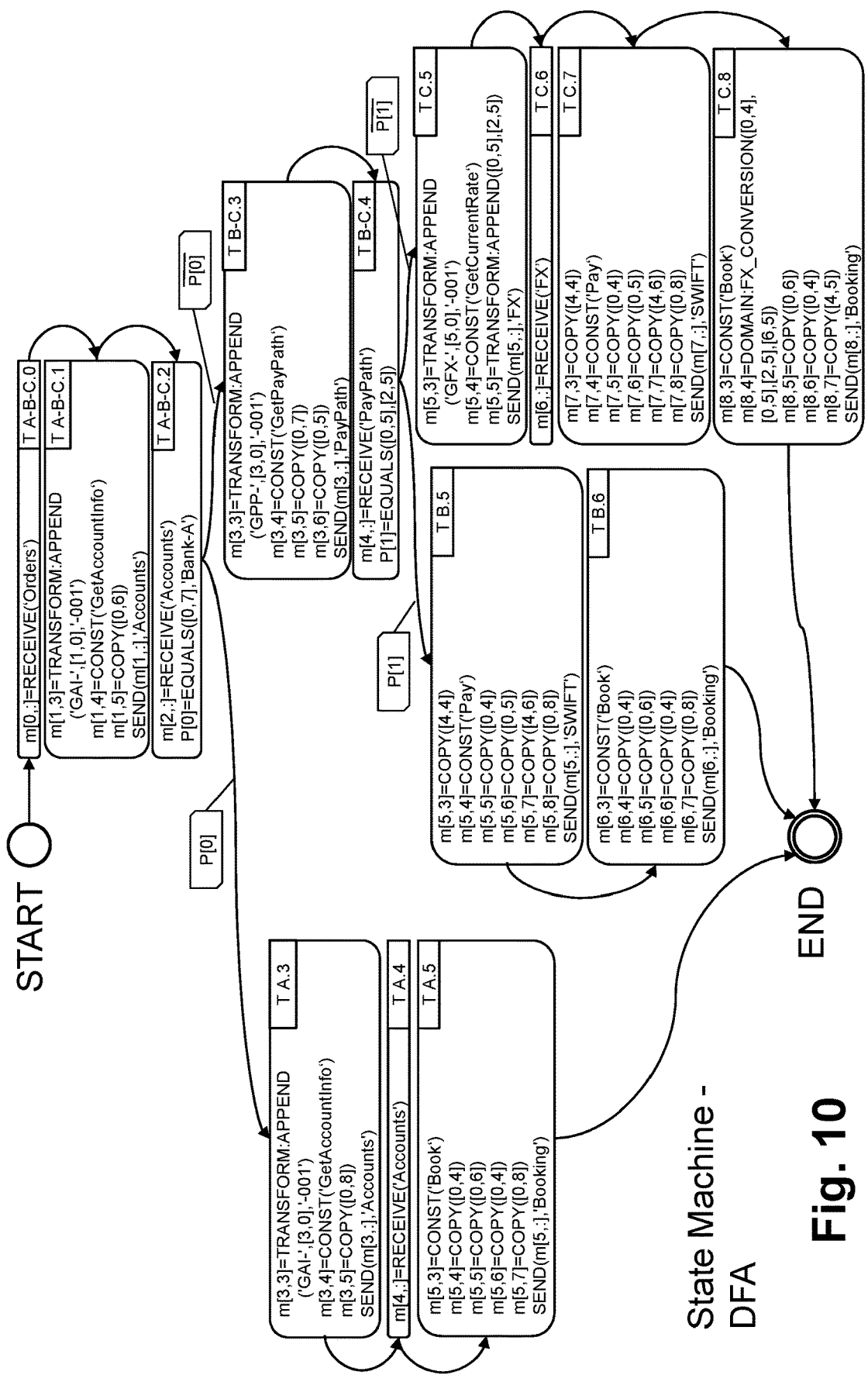
FIG. 10 illustrates schematically a state machine in the form of a deterministic finite automaton (DFA).

FIGS. 6a and 6b illustrate schematically examples of single transaction traces. FIGS. 7a, 7b, 7c, 7d and 7e illustrate schematically examples of single transaction traces with associated potential actions (listed under respective output field for easier understanding). FIGS. 8a and 8b illustrate schematically transaction templates generalized from single transaction message traces. FIG. 9 illustrates schematically a state machine in the form of a non-deterministic finite automaton (NFA). FIG. 10 illustrates schematically a state machine in the form of a deterministic finite automaton (DFA). FIGS. 6a, 6b, 7a, 7b, 7c, 7d, 7e, 8a, 8b, 9 and 10 illustrate schematically particular examples which are self-explanatory. In the Figures, messages stored in memory device 9 are denoted by m[i,j], i being a message identifier and j being a message field, or [i,j] in short when reading a message field. Predicates P stored in memory device 9 are denoted by P[i], with i referencing the respective predicate. RECEIVE, SEND, CONST, COPY, EQUALS denote respective actions to be executed by data flow and transformation engine 82, while TRANSFORM: <name> denotes a call to a function <name> in library 7 of transformation functions called TRANSFORM, and DOMAIN:<name> denotes a call to a function <name> in library 7 of application-domain specific functions called DOMAIN. Actions separated by semicolon denote different possible actions to calculate the output field value, from which electronic device 5 selects one action for inclusion in ACTIONS table 10.

The electronic device 5 may include one or more computer network interfaces, one or more processors, memory, and one or more programs. The one or more computer network interfaces are connectable to the transaction-processing system 1 for collecting transaction related messages 4. received and transmitted by the running transaction-processing system 1. The one or more programs are stored in the memory and configured to be executed by the one or more processors. The one or more programs include computer-executable instructions for performing the operations of the functions of the electronic device 5 and/or the method steps as described above, including e.g. the functions and/or methods steps performed by the data collector 51, the remake builder 52 and the difference module 53 as described above, which are software enabled sections of the electronic device. A computer readable storage medium may have stored therein computer-executable instructions, which, when executed by the electronic device 5 having one or more computer network interfaces, memory and one or more processors, cause the electronic device 5 to perform the operations of the functions and/or the method steps described above. For example, the computer-executable instructions include instructions which, when executed by the one or more processors, configure the one or more processors to perform operations which perform the functions and/or the method steps of the data collector 51, the remake builder 52 and the difference module 53 as described above.

The present disclosure is not inherently related to any particular computer or other apparatus. Various general-purpose systems can be used with programs in accordance with the teachings herein, or it can prove convenient to construct more specialized apparatuses, such as hardware logic circuits. The required structure will appear from the description. As will be apparent to one of ordinary skill in the relevant art, the modules, features, attributes, methodologies, and other aspects can be implemented as software, hardware, firmware or any combination thereof. The present teaching is in no way limited to implementation in any specific operating system or environment.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The figures are only schematic. Same reference signs refer to same or similar features.

What is claimed is:

1. An electronic device for at least partially building a remake system of a transaction-processing system, wherein the transaction-processing system is configured to perform transactions, each transaction resulting in a particular set of transaction related messages received and transmitted by the transaction-processing system, wherein the electronic device is a device which is distinct from the transaction-processing system, the electronic device being configured to:

while the transaction-processing system is running, collect transaction related messages flowing into the transaction-processing system (received transaction related messages) and transaction related messages that flow out of the transaction-processing system (transmitted transaction related messages), the transaction related messages being received and transmitted by the running transaction processing system as a result of processing transactions;

determine from the collected transaction related messages sets of transaction related messages, each set including received and transmitted transaction related messages of a particular, single transaction performed by the transaction-processing system;

determine transaction templates from one or more of the sets of transaction related messages, each determined transaction template for each set including a specification of the transaction specifying at least one operation that would produce the transmitted messages in the set from the related received messages in the set; and at least partially build the remake system of the transaction-processing system with the determined transaction templates, the remake system being configured to perform based on the determined transaction templates transactions of the transaction-processing system for producing the same transaction related messages as the transaction-processing system in a commercial environment.

2. The electronic device of claim 1, further configured to collect one or more of transaction order messages, request/reply messages, and transaction result messages, and to assign transaction templates on the basis of the one or more of the transaction order messages, the request/reply messages, and the transaction result messages.

3. The electronic device of claim 1, further configured to extract common transaction templates for two or more transactions.

4. The electronic device of claim 1, further configured to at least partially build the remake system in the form of a software application executable on a standard computer.

5. The electronic device of claim 1, further configured to use the transaction templates for the definition of a state machine.

6. The electronic device of claim 1, further configured to determine differences between transaction related messages of the running transaction-processing system and transaction related messages of the remake system operating in parallel and receiving the same transaction related input messages as the running transaction-processing system and to at least partially update the remake system accordingly.

7. The electronic device of claim 1, further configured to at least partially build the remake system in a form enabling moving an auxiliary system interacting with the running transaction-processing system into a test environment for the purpose of testing the auxiliary system without the transaction-processing system being available in the test environment.

8. The electronic device of claim 1, further configured to collect transaction related messages received and transmitted by the transaction-processing system running in a test environment enabling processing of transactions in a strictly sequential manner.

9. The electronic device of claim 1, further configured to collect transaction related messages received and transmitted by the running transaction-processing system being adapted to provide transaction related messages which include an unambiguous identifier for each transaction.

10. The electronic device of claim 1, further configured to collect transaction related messages received and transmitted by the running transaction-processing system being installed in a productive environment.

11. A method for building a remake system of a transaction-processing system, the transaction-processing system being configured to perform transactions, each transaction resulting in a particular set of transaction related messages received and transmitted by the transaction-processing system, the method being implemented using an electronic device, wherein the electronic device is a device which is distinct from the transaction-processing system, the method comprising:
while the transaction-processing system is running, collecting transaction related messages flowing into the transaction-processing system (received transaction related messages) and transaction related messages that flow out of the transaction-processing system (transmitted transaction related messages), the transaction related messages being received and transmitted by the running transaction-processing system as a result of processing transactions;
determining from the collected transaction related messages sets of transaction related messages, each set including received and transmitted transaction related messages of a particular, single transaction performed by the transaction-processing system;
determining transaction templates from one or more of the sets of transaction related messages, each determined transaction, template for each set including a specification of the transaction specifying at least one operation that would produce the transmitted messages in the set from the related received messages in the set; and
at least partially building the remake system of the transaction-processing system with the determined transaction templates, the remake system being configured to perform based on the determined transaction templates transactions of the transaction processing system for producing the same transaction related messages as the transaction-processing system in a commercial environment.

12. The method of claim 11, further including: extracting common transaction templates for two or more transactions.

13. The method of claim 11, further including: using the transaction templates for the definition of a state machine.

14. The method of claim 11, further including: determining differences between transaction related messages of the running transaction-processing system and transaction related messages of the remake system operating in parallel and receiving the same transaction related input messages as the running transaction-processing system and at least partially updating the remake system accordingly.

15. A non-transitory computer-readable storage medium storing computer-executable instructions for building a remake system of a transaction-processing system, the transaction-processing system being configured to perform transactions, each transaction resulting in a particular set of transaction related messages received and transmitted by the transaction-processing system, wherein when the computer-executable instructions are executed by one or more processors of an electronic device that is distinct from the transaction-processing system, configure the one or more processors to perform operations comprising:
while the transaction-processing system is running, collecting transaction related messages flowing into the transaction-processing system (received transaction related messages) and transaction related messages that flow out of the transaction-processing system (transmitted transaction related messages), the transaction related messages being received and transmitted by the running transaction-processing system as a result of processing transactions;
determining from the collected transaction related messages sets of transaction related messages, each set including received and transmitted transaction related messages by the transaction-processing system of a particular, single transaction performed by the transaction-processing system;
determining transaction templates from one or more of the sets of transaction related messages, each determined transaction template for each set including a specification of the transaction specifying at least one operation that would produce the transmitted messages in the set from the related received messages in the set; and
at least partially building the remake system of the transaction-processing system with the determined transaction templates, the remake system being configured to perform based on the determined transaction templates transactions of the transaction-processing system for producing the same transaction related messages as the transaction-processing system in a commercial environment.

16. The non-transitory computer-readable storage medium of claim 15, wherein common transaction templates are extracted for two or more transactions.

17. The non-transitory computer-readable storage medium of claim 15, wherein the transaction templates are used for the definition of a state machine.

18. The non-transitory computer-readable storage medium of claim 15, wherein differences between transaction related messages of the running transaction-processing system and transaction related messages of the remake system run according to transaction related messages of the transaction-processing system are determined and the remake system is updated accordingly.

\* \* \* \* \*